US010813044B2

United States Patent
Kavuri et al.

(10) Patent No.: US 10,813,044 B2
(45) Date of Patent: Oct. 20, 2020

(54) ACCESS TYPE SELECTION IN A 5G NETWORK

(71) Applicant: Apple Inc., Cupertino, CA (US)

(72) Inventors: Lakshmi N. Kavuri, San Jose, CA (US); Krisztian Kiss, Hayward, CA (US); Yifan Zhu, San Jose, CA (US); Viswanath Nagarajan, San Jose, CA (US); Shivani Suresh Babu, San Jose, CA (US); Utkarsh Kumar, Fremont, CA (US); Srinivasan Nimmala, San Jose, CA (US); Hariharan Sukumar, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/405,175

(22) Filed: May 7, 2019

(65) Prior Publication Data

US 2019/0349849 A1 Nov. 14, 2019

Related U.S. Application Data

(60) Provisional application No. 62/670,542, filed on May 11, 2018.

(51) Int. Cl.
| | | |
|---|---|---|
| *H04W 4/00* | (2018.01) | |
| *H04W 48/18* | (2009.01) | |
| *H04W 48/16* | (2009.01) | |
| *H04W 8/18* | (2009.01) | |
| *H04W 8/22* | (2009.01) | |
| *H04W 60/04* | (2009.01) | |
| *H04W 76/16* | (2018.01) | |

(Continued)

(52) U.S. Cl.
CPC ............. *H04W 48/18* (2013.01); *H04W 8/18* (2013.01); *H04W 8/22* (2013.01); *H04W 36/0022* (2013.01); *H04W 36/305* (2018.08); *H04W 48/16* (2013.01); *H04W 60/04* (2013.01); *H04W 60/06* (2013.01); *H04W 76/16* (2018.02); *H04W 84/042* (2013.01)

(58) Field of Classification Search
CPC ........... H04W 60/04–06; H04W 48/16; H04W 36/0022; H04W 8/22
See application file for complete search history.

(56) References Cited

U.S. PATENT DOCUMENTS

| | | | |
|---|---|---|---|
| 9,681,480 B2 | 6/2017 | Adjakple et al. | |
| 2012/0008551 A1* | 1/2012 | Giaretta | H04W 60/06 370/328 |

(Continued)

FOREIGN PATENT DOCUMENTS

WO WO-2018143774 A1 * 8/2018 ............. H04W 4/02

OTHER PUBLICATIONS

Junseok Kim et al., "3GPP SA2 architecture and functions for 5G mobile communication system," ScienceDirect (www.sciencedirect.com), Apr. 13, 2017, The Korean Institute of Communications Information Sciences, Elsevier B.V., Korea.

*Primary Examiner* — Charles T Shedrick
(74) *Attorney, Agent, or Firm* — Kowert, Hood, Munyon, Rankin & Goetzel, P.C.

(57) ABSTRACT

This disclosure relates to techniques for selecting an access for transmitting messages on a 5G network. An access may be selected based on determined conditions in relation to one or more network policies and a message may be transmitted on the selected access.

20 Claims, 15 Drawing Sheets

(51) Int. Cl.
   *H04W 36/00* (2009.01)
   *H04W 36/30* (2009.01)
   *H04W 60/06* (2009.01)
   *H04W 84/04* (2009.01)

(56) References Cited

U.S. PATENT DOCUMENTS

| | | | |
|---|---|---|---|
| 2013/0150041 A1* | 6/2013 | Shaheen | H04W 12/04031 |
| | | | 455/436 |
| 2018/0270781 A1* | 9/2018 | Baek | H04W 60/06 |
| 2018/0376384 A1* | 12/2018 | Youn | H04W 36/0022 |
| 2018/0376446 A1 | 12/2018 | Youn et al. | |
| 2019/0007992 A1 | 1/2019 | Kim et al. | |
| 2019/0029065 A1 | 1/2019 | Park et al. | |
| 2019/0037448 A1* | 1/2019 | Shan | H04W 4/46 |
| 2019/0059067 A1* | 2/2019 | Lee | H04W 60/04 |
| 2019/0098547 A1* | 3/2019 | Chong | H04W 36/12 |
| 2019/0150081 A1* | 5/2019 | Qiao | H04W 60/005 |
| | | | 370/329 |
| 2019/0159158 A1* | 5/2019 | Kang | H04W 60/06 |
| 2019/0289534 A1* | 9/2019 | Ryoo | H04W 80/02 |
| 2020/0092710 A1* | 3/2020 | Kim | H04W 8/10 |
| 2020/0120585 A1* | 4/2020 | Kumar | H04W 36/0033 |

* cited by examiner

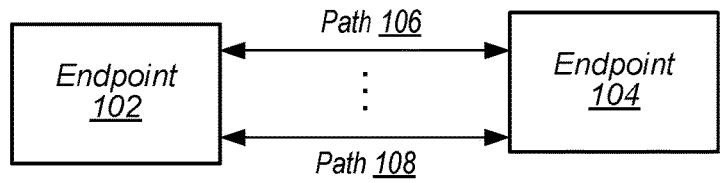
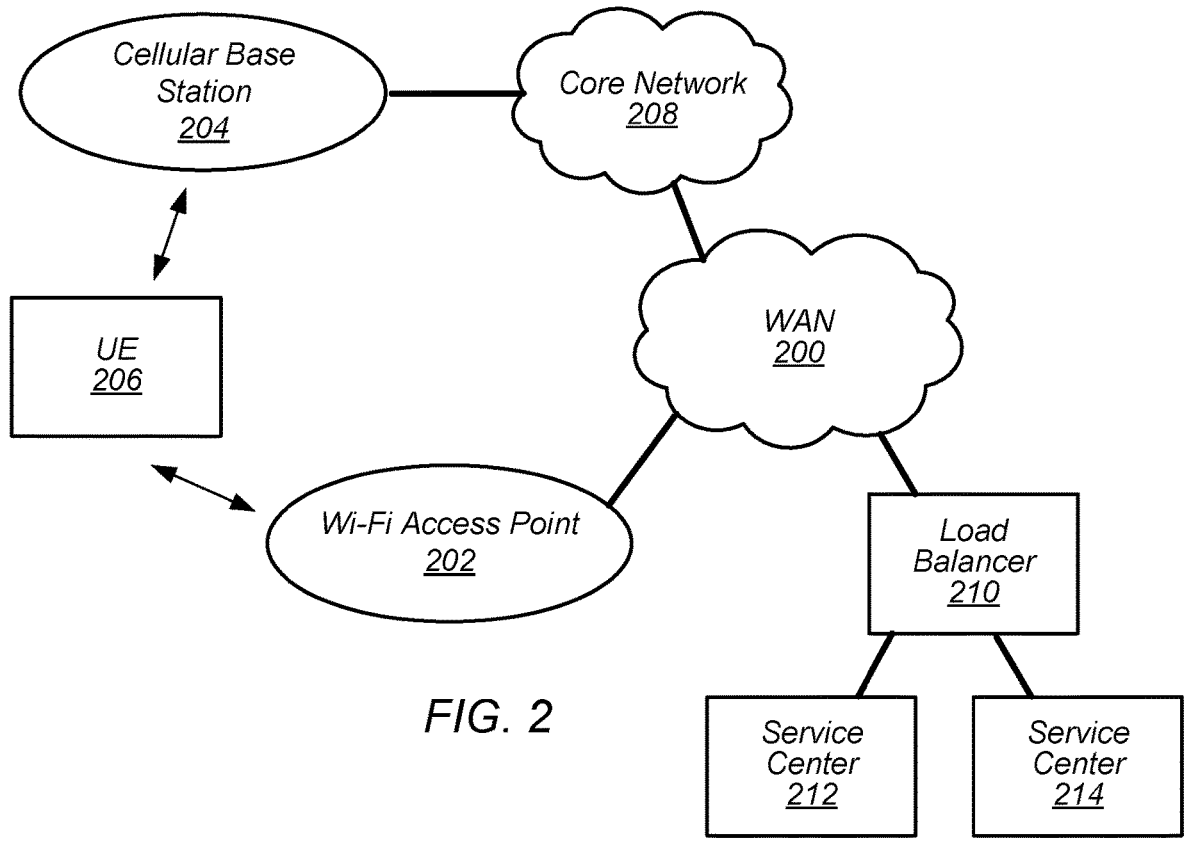
FIG. 1
FIG. 2
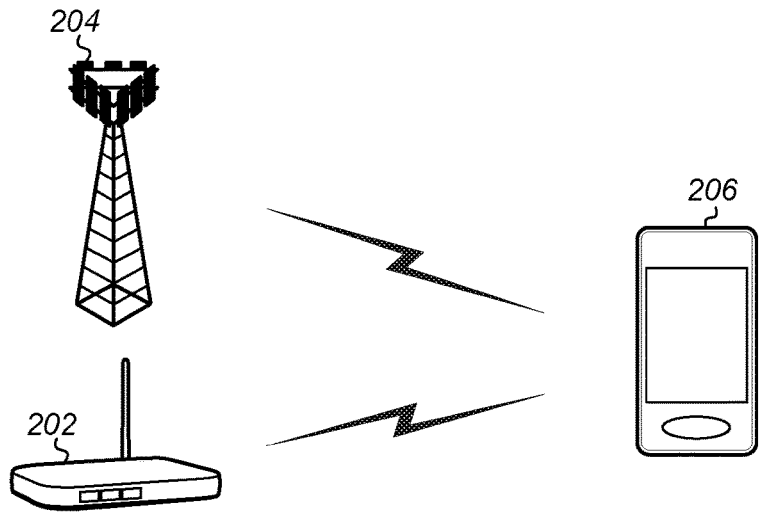
FIG. 3

ACCESS TYPE SELECTION IN A 5G NETWORK

PRIORITY CLAIM

This application claims priority to U.S. provisional patent application Ser. No. 62/670,542, entitled "Access Type Selection in a 5G Network," filed May 11, 2018, which is hereby incorporated by reference in its entirety as though fully and completely set forth herein.

FIELD

The present application relates to apparatuses, systems, and methods for providing a multipath transmission control protocol proxy in a cellular network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 5G, 5G NR, HSPA, 3GPP2 CDMA2000 (e.g., 1xRTT, 1xEV-DO, HRPD, eHRPD), IEEE 802.11 (WLAN or Wi-Fi), BLUETOOTH™, etc. 3rd Generation Partnership Project (3GPP) is an organization that develops certain wireless standards, including LTE and 5G.

The ever increasing number of features and functionality introduced in wireless communication devices also creates a continuous need for improvement in both wireless communications and in wireless communication devices. In particular, it is important to ensure the accuracy of transmitted and received signals for user equipment (UE) devices, e.g., for wireless devices such as cellular phones, base stations and relay stations used in wireless cellular communications. In addition, increasing the functionality of a UE device can place a significant strain on the battery life of the UE device. Thus it may be important to also reduce power requirements in UE device designs while allowing the UE device to maintain good transmit and receive abilities for improved communications.

Accordingly, improvements in the field in support of such development and design are desired.

SUMMARY

Embodiments are presented herein of apparatuses, systems, and methods for selecting an access type in a 5G environment. Based on a type of message to be transmitted and a determination of current conditions, an access type may be selected. The access type may be either 3GPP or non-3GPP, according to some embodiments. The message may be transmitted on the selected access. Additional messages may be exchanged on the selected access and/or other accesses.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 1-2 illustrate an exemplary (and simplified) wireless communication system, according to some embodiments;

FIG. 3 illustrates an exemplary base station (BS) and an exemplary access point (AP) in communication with an exemplary wireless user equipment (UE) device, according to some embodiments;

Figure 4:
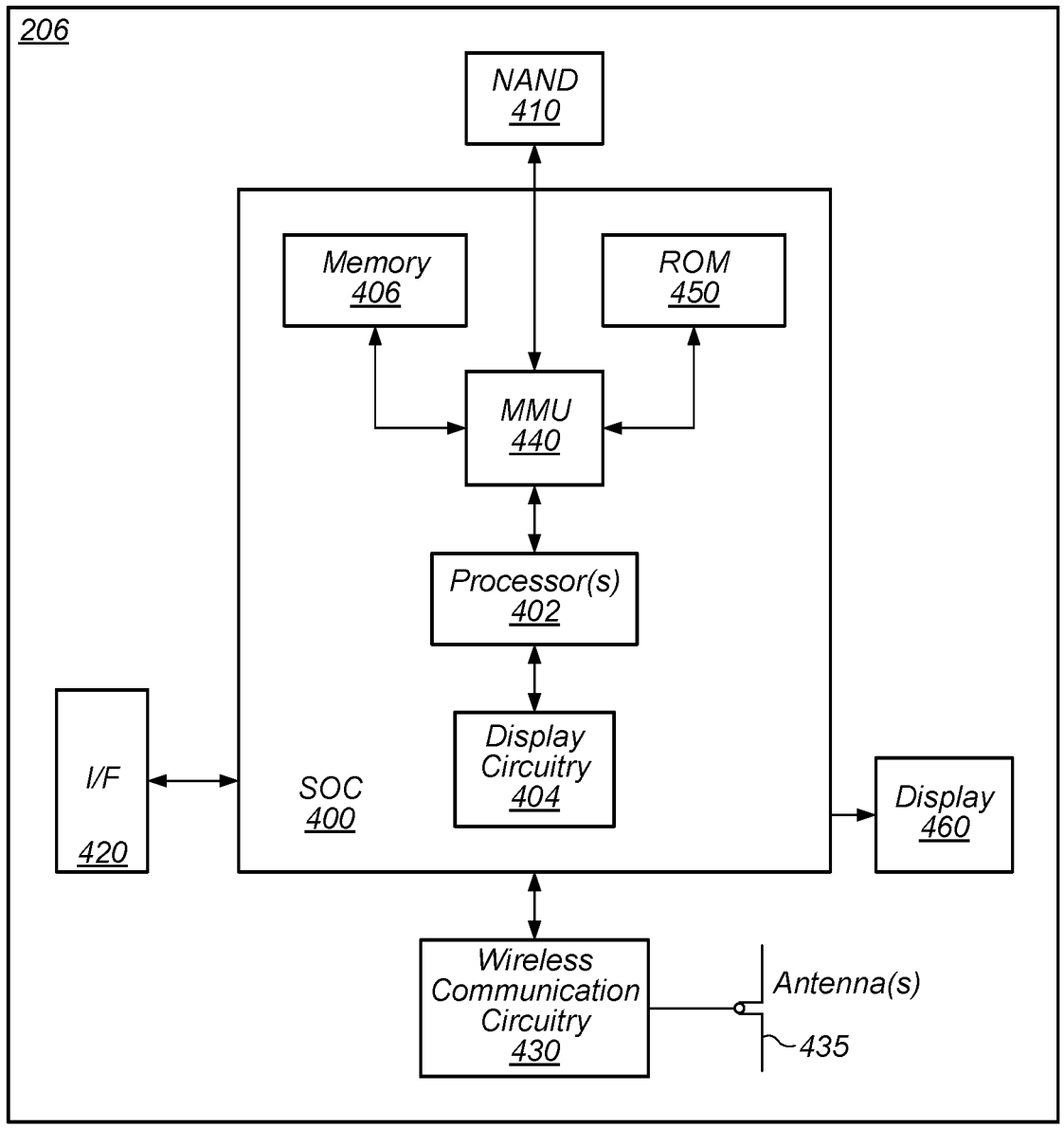
FIG. 4 illustrates an exemplary block diagram of a UE device, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel"

as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Authentication Server Function (AUSF)
    Access and Mobility Management Function (AMF)
    Data Network (DN), e.g. operator services, Internet access or 3rd party services
    Network Exposure Function (NEF)
    Network Repository Function (NRF)
    Network Slice Selection Function (NSSF)
    Policy Control Function (PCF)
    Session Management Function (SMF)
    Unified Data Management (UDM)
    Unified Data Repository (UDR)
    User Plane Function (UPF)
    Application Function (AF)
    User Equipment (UE)
    Home Subscriber System (HSS)
    Non 3GPP Inter-Working Function (N3IWF)
    Globally Unique Temporary ID (GUTI)
    Universal integrated circuit card (UICC)
    5G Mobility Management (5GMM or 5G-MM)
    5G Supplementary Services (5GSM)
    Connection Management (CM)
    Registration Management (RM)
    Access Stratum (AS)
    Non-AS (NAS)

FIGS. 1-3—Communication System

FIGS. 1-2 illustrate exemplary (and simplified) communication systems, according to certain embodiments. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 or path 108.

Each of endpoint 102 and endpoint 104 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a bridge, a load balancer, a personal desktop computer or workstation, a set top box, a television, etc. A fixed endpoint may be a network element such as an access and mobility management function (AMF), etc. A mobile endpoint may be an endpoint which is substantially mobile and/or which communicates by way of one or more wireless communication techniques. Some examples might include a mobile telephone or smart phone, tablet computer, portable gaming device, portable media player, etc. Note that hybrid endpoints which share traits of both fixed and mobile endpoints are also possible. For example, many laptop computers may be capable of performing both wireless (e.g., Wi-Fi) and wired (e.g., Ethernet) communication, and additionally may be capable of substantial movement (e.g., when operating from battery reserve power) or may be substantially stationary (e.g., when docked and/or connected to a wall outlet for power) at various times.

In some embodiments, one or both of the endpoints may further connect to additional devices. For example, a mobile endpoint such as a smart phone may be connected to a fixed endpoint such as an AMF, which may in turn connect the smart phone to a data network (e.g., the internet).

One or both of endpoints 102, 104 may be multihomed. For example, one or both of endpoint 102, 104 may be capable of communicating via multiple network interfaces. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) link or connection between endpoints 102 and 104. The MPTCP connection may be established according to and/or include any of various features described in the MPTCP specification IETF RFC 6824, at least according to some embodiments. For example, one or more subflows of the MPTCP connection may be established over path 106, while one or more subflows of the MPTCP connection may be established over path 108. Any number of additional subflows may optionally be created over one or more other paths, if desired. Such an MPTCP connection may be established and configured/controlled according to various aspects of the present disclosure.

The exemplary wireless communication system illustrated in FIG. 2 represents one possible communication system having the characteristics of the exemplary wireless communication system illustrated in FIG. 1. In particular, a first endpoint (e.g., a wireless user equipment ("UE") device 206) may be capable of communicating with another endpoint (e.g., load balancer 210) using either of a first communication path (e.g., via cellular base station 204, core network 208, and wide area network 200) or a second communication path (e.g., via Wi-Fi/WLAN access point (AP) 202 and wide area network 200).

As shown, the UE device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the UE 206 and the network 200. The access point 202 and the UE 206 may be configured to communicate over the transmission medium using Wi-Fi, including any of various versions of IEEE 802.11 (e.g., a, b, g, n, ac, ax, ba, etc.). Note that the access point 202 may also facilitate communication between the UE and other computing devices which also participate in the WLAN directly.

The base station 204 may be a base transceiver station (BTS) or cell site (a "cellular base station"), and may include hardware that enables wireless communication with cellular devices (such as UE 206) according to one or more cellular communication protocols. If the base station 204 is implemented in the context of LTE, it may alternately be referred to as an 'eNodeB'. If the base station 204 is implemented in the context of 5G NR, it may alternately be referred to as an 'gNodeB' or 'gNB'. The UE 206 and the cellular base station 204 may communicate using any of various cellular communication technologies such as GSM, UMTS (WCDMA, TD-SCDMA), LTE, LTE-Advanced (LTE-A), 5G NR, HSPA, 3GPP2 CDMA2000 (e.g., 1xRTT, 1xEV-DO, HRPD, eHRPD), etc.

As shown, the cellular base station may be equipped to communicate with a core network 208 (potentially including any number of core network slices) of a cellular service provider (e.g., a public land mobile network (PLMN)). Thus, the base station 204 may facilitate communication between the UE 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the UE 206 (and potentially numerous other UEs) with various telecommunication capabilities, such as voice and SMS services and/or data services.

The communication area (or coverage area) of the base station may be referred to as a "cell." Base station 204 and other similar base stations operating according to the same or a different cellular communication standard may be provided as a network of cells, which may provide continuous or nearly continuous overlapping service to UEs and similar devices over a geographic area via one or more cellular communication standards. In other words, at least according to some embodiments, the base station 204 may function as a node in the radio access network (RAN) of a cellular network operator.

Thus, UE 206 may be capable of communicating using multiple wireless communication standards, including at least one wireless networking protocol (e.g., Wi-Fi) and at least one cellular communication protocol (e.g., GSM, UMTS (WCDMA, TD-SCDMA), LTE, LTE-Advanced (LTE-A), NR, HSPA, 3GPP2 CDMA2000 (e.g., 1xRTT, 1xEV-DO, HRPD, eHRPD), etc.). Note additionally that the UE 206 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. In addition, or as an alternative, the UE 206 may be capable of communicating using one or more wired communication standards. For example, the UE 206 may be capable of communicating with one or more wired access points, e.g., via Ethernet. It may, for example, be possible for the UE 206 to couple via wired means to the Wi-Fi access point 202 in addition to or as an alternative to utilizing Wi-Fi communication. Other combinations of wireless and wired communication standards (including more than two wireless and/or wired communication standards) are also possible.

The load balancer 210 may also be equipped to communicate with WAN 200. The load balancer 210 may provide access to a cluster or server farm configured to provide one or more cloud-based services via the Internet. For example, as shown, the load balancer may further be equipped to communicate with service centers 212, 214, which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while load balancer 210 is shown in FIG. 2 as one possible exemplary access port (and potential MPTCP endpoint) to service centers 212, 214, any of various devices may be used (alternatively or in combination with load balancer 210) as intermediary/access port devices/entities to the service centers 212, 214 if desired, such as gateways, routers, firewalls, and/or any of various other "middleboxes". In addition, it should be noted that while not explicitly shown, the load balancer 210 may include any number of network interfaces for connecting to the WAN 200, including one or more wired network interfaces and/or one or more wireless network interfaces.

FIG. 3 illustrates the UE device 206 in communication with the cellular base station 204 and the Wi-Fi access point 202. The UE 206 may be a device with multiple wireless network connectivity such as a mobile phone, a hand-held device, a wearable device, a computer or a tablet, or virtually any type of wireless device.

The UE 206 may include a processor that is configured to execute program instructions stored in memory. The UE 206 may perform any of the method embodiments described herein by executing such stored instructions. Alternatively, or in addition, the UE 206 may include a programmable hardware element such as an FPGA (field-programmable gate array) that is configured to perform any of the method embodiments described herein, or any portion of any of the method embodiments described herein.

The UE 206 may be configured to communicate using any of multiple wireless communication protocols. For example, the UE 206 may be configured to communicate using at least one cellular communication protocol (such as GSM, UMTS, CDMA2000, LTE, LTE-A, NR, etc.) and Wi-Fi. Other combinations of wireless and/or wired communication standards are also possible.

The UE 206 may include one or more antennas for communicating using one or more wireless communication protocols or technologies. In one embodiment, the UE 206 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 206 may share one or more parts of a receive and/or transmit chain between multiple wireless communication technologies, such as those discussed above.

In some embodiments, the UE 206 may include separate (and possibly multiple) transmit and/or receive chains (e.g., including separate RF and/or digital radio components) for each wireless communication protocol with which it is configured to communicate. As a further possibility, the UE 206 may include one or more radios that are shared between multiple wireless communication protocols, and one or more radios that are used exclusively by a single wireless communication protocol. For example, the UE 206 might include a shared radio for communicating using either of LTE or 1×RTT (or LTE or GSM, or LTE or NR, etc.), and separate radios for communicating using each of Wi-Fi and Bluetooth. Other configurations are also possible.

FIG. 4—Exemplary Block Diagram of a UE

FIG. 4 illustrates an exemplary block diagram of a UE 206, according to some embodiments. As shown, the UE 206 may include a system on chip (SOC) 400, which may include portions for various purposes. For example, as shown, the SOC 400 may include processor(s) 402 which may execute program instructions for the UE 206 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 206. For example, the UE 206 may include various types of memory (e.g., including NAND flash 410), a connector interface 420 (e.g., for coupling to a computer system, dock, charging station, etc.), the display 460, and wireless communication circuitry 430 (e.g., radio) (e.g., for LTE, NR, Wi-Fi, GPS, etc.).

As noted above, the UE 206 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 206 may include at least one antenna (and possibly multiple antennas, e.g., for MIMO and/or for implementing different wireless communication technologies, among various possibilities), for performing wireless communication with cellular base stations and/or other devices. For example, the UE device 206 may use antenna(s) 435 to perform the wireless communication.

As described further subsequently herein, the UE 206 may include hardware and/or software components for implementing and/or supporting implementation of features described herein. The processor 402 of the UE device 206 may be configured to implement part or all of the methods described herein, e.g., by executing program instructions stored on a memory medium (e.g., a non-transitory computer-readable memory medium). In other embodiments, processor 402 may be configured as a programmable hardware element, such as an FPGA (Field Programmable Gate Array), or as an ASIC (Application Specific Integrated Circuit). Alternatively (or in addition) the processor 402 of the UE device 206, in conjunction with one or more of the other components 400, 404, 406, 410, 420, 430, 435, 440, 450, 460 may be configured to implement part or all of the features described herein.

Figure 5:
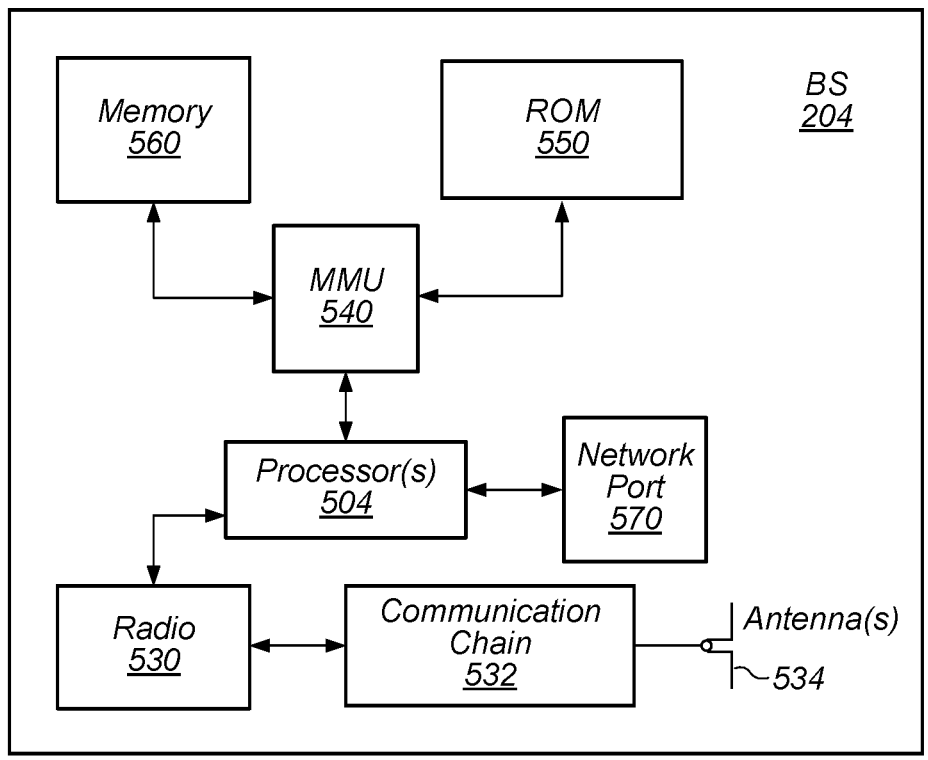
FIG. 5 illustrates an exemplary block diagram of a BS, according to some embodiments.

FIG. 5—Exemplary Block Diagram of a Base Station

FIG. 5 illustrates an exemplary block diagram of a base station 204. It is noted that the base station of FIG. 4 is merely one example of a possible base station. As shown, the base station 204 may include processor(s) 504 which may execute program instructions for the base station 204. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 204 may include at least one network port 570. The network port 570 may be configured to couple to a network and provide a plurality of devices, such as UE devices 206, access to the network as described previously herein.

In some instances, the network port 570 (or an additional network port) may be configured to couple to any of various possible cellular network entities, e.g., including one or more core network instances or core network slices of a cellular service provider, a network slice selection function, an access and mobility management function, a session management function, and/or various other possible cellular network entities. The core network(s) may provide mobility related services and/or other services to a plurality of devices, such as UE devices 206. In some cases, the network port 570 may couple to a telephone network via the core network(s), and/or the core network(s) may provide a telephone network (e.g., among other UE devices serviced by the cellular service provider).

The base station 204 may include at least one antenna 534, and possibly multiple antennas. The antenna(s) 534 may be configured to operate as a wireless transceiver and may be further configured to communicate with UE devices 206 via radio 530. The antenna(s) 534 communicates with the radio 530 via communication chain 532. Communication chain 532 may be a receive chain, a transmit chain or both. The radio 530 may be configured to communicate via various wireless telecommunication standards, including, but not limited to, LTE, LTE-A, NR, UMTS, CDMA2000, Wi-Fi, etc.

The BS 204 may be configured to communicate wirelessly using multiple wireless communication standards. In some instances, the base station 204 may include multiple radios, which may enable the base station 204 to communicate according to multiple wireless communication technologies. For example, as one possibility, the base station 204 may include an LTE radio for performing communication according to LTE as well as a Wi-Fi radio for performing communication according to Wi-Fi. In such a case, the base station 204 may be capable of operating as both an LTE base station and a Wi-Fi access point. As another possibility, the base station 204 may include a multi-mode radio which is capable of performing communications according to any of multiple wireless communication technologies (e.g., NR and LTE, NR and Wi-Fi, LTE and Wi-Fi, LTE and UMTS, LTE and CDMA2000, UMTS and GSM, etc.).

The BS 204 may be configured to act as a node of a radio access network (RAN) of a cellular network. Thus, the BS 204 may provide radio access to the cellular network (e.g., including one or more core network instances, as previously noted) to wireless devices. According to some embodiments, the BS 204 may be configured to implement multiple possible RAN slices, e.g., to accomodate different scenarios with respect to RAN functionality, performance, isolation, etc. The different RAN slices may include different sets of RAN functions, and/or differently configured RAN functions (e.g., having different resource pools, etc.).

As described further subsequently herein, the BS 204 may include hardware and software components for implementing and/or supporting implementation of features described herein. The processor 504 of the base station 204 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. Alternatively (or in addition) the processor 504 of the BS 204, in conjunction with one or more of the other components 530, 532, 534, 540, 550, 560, 570 may be configured to implement or support implementation of part or all of the features described herein.

Figure 6:
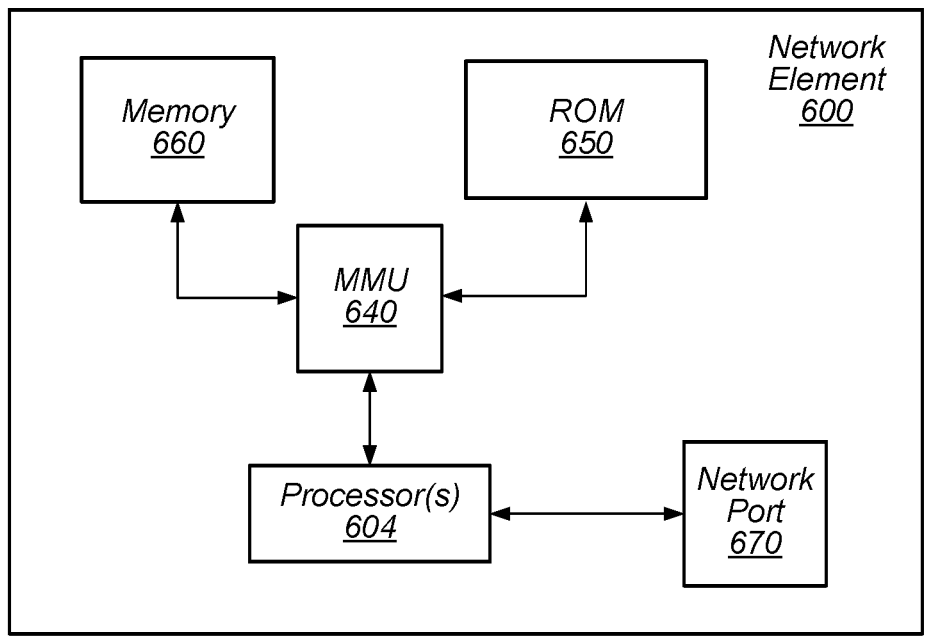
FIG. 6 illustrates an exemplary block diagram of a core network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as an access and mobility management function (AMF) or mobility management entity (MME), a session management function (SMF), a serving gateway (S-GW), a network slice selection function (NSSF) entity, a MPTCP proxy, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
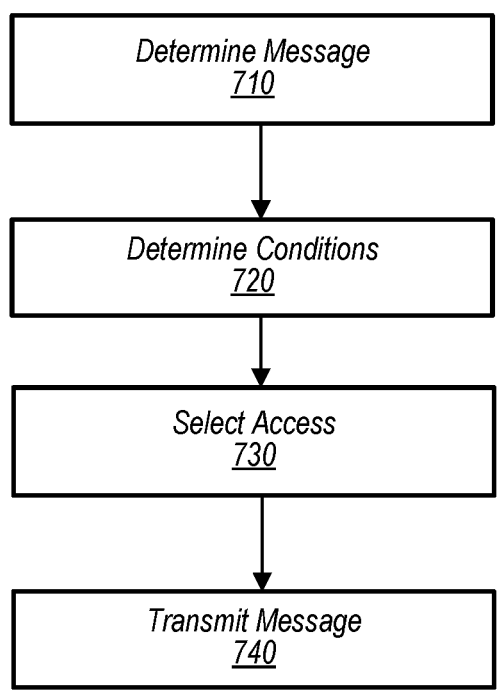
FIG. 7 illustrates an exemplary process for selecting and using an access, according to some embodiments.

FIG. 7—Access Selection

As noted above, there may be various communication paths between two devices. For example, some UEs may be capable of communication (e.g., with a PLMN or other network) via 3GPP wireless links (e.g., LTE, 5G, etc.) and through non-3GPP wireless links (e.g., WLAN, Wi-Fi, 802.11, Bluetooth, etc.). These various wireless links may be referred to as accesses, e.g., a 3GPP access or a non-3GPP access. In the context of 5G, for example, the network (e.g., a network element such as an AMF) and/or the UE may select or decide which access or accesses should be used to transmit various messages (e.g., same or different accesses may be used for various individual messages or groups of messages) between the UE and the network. Such a UE may be able to communicate with the network via a 3GPP radio access network (RAN) (e.g., a cellular network), which may communicate with an AMF, or via a non-3GPP (e.g., WLAN) AP, which may communicate with a Non-3GPP Interworking Function (N3IWF) or other network node, which in turn may communicate with the AMF. A N3IWF may be a network element that provides access to a 5G core network (CN) via a non-3GPP RAT, such as WLAN, among other possibilities. The N3IWF (e.g., in coordination with the AMF and/or other network elements) may provide unified authentication and simultaneous registration to the UE on both accesses (e.g., 3GPP and non-3GPP). For example, the N3IWF may provide registration and authentication on the non-3GPP access and may coordinate with the AMF which may provide these services on the 3GPP access. In some embodiments, registration and authentication on one access may also provide registration and authentication on the other access. In other words, a UE may register to the same PLMN (e.g., same 5G Core network) using 3GPP access as well as non-3GPP access. As an example, a 3GPP access may refer to an access using a cellular wireless link and a 3GPP wireless standard and a non-3GPP access may refer to a WLAN (e.g., Wi-Fi) wireless link, among various possibilities.

The UE may operate in various states (e.g., connection states) with regard to the various accesses, e.g., the UE may be connected or idle for either or both accesses (e.g., the UE may be connected to one, and idle to another, etc.). Thus, the network and the UE may be able to exchange messages through either or both accesses. For example, common mobility management procedures (e.g., registration, de-registration, identification, authentication etc.) may be performed over either or both accesses. The UE and network may exchange information about one access over the other access and also they may reuse the identity and/or authentication parameters assigned in one access in another access.

Similarly, an AMF may inform a UE about downlink signaling or user data over either or both accesses. In other words, in some embodiments, (e.g., or under some circumstances), the network may choose to provide the actual signaling or user data over 3GPP or non-3GPP, but may alert the UE to the existence of such signaling or user data over either access. To provide such an alert, an AMF may send a page over 3GPP or a notification message (msg) over non-3GPP access. In some embodiments, a notification msg over non-3GPP access may offer security advantages, e.g., by avoiding transmission of the GUTI in live air. In some embodiments, the GUTI may be transmitted as part of a 3GPP page. A UE may respond to the alert with a service request.

The way a network may send such an alert or indication (e.g., page or notification message) may depend on various factors. For example, such factors may include a paging policy of the network and/or the connection status of the UE with respect to each access. More specifically, the service request procedure may be initiated by the UE, however, it may be triggered by the network by means of:

a) the paging procedure (e.g., see section 5.6.2 of 3GPP 24.501) for the transfer of downlink signaling or user data pending over 3GPP access to a UE that may be operating in 5GMM-IDLE mode over 3GPP access;

b) the paging procedure (see section 5.6.2) for the transfer of downlink signaling or user data pending over non-3GPP access to a UE that may be operating in 5GMM-IDLE mode over 3GPP access and that may be operating in 5GMM-IDLE mode over non-3GPP access;

c) the notification procedure (see section 5.6.3) for the transfer of downlink signaling or user data pending over non-3GPP access to a UE that may be operating in 5GMM-CONNECTED mode over 3GPP access and that may be operating in 5GMM-IDLE mode over non-3GPP access; or d) the notification procedure (see section 5.6.3) for the transfer of downlink signaling or user data pending over 3GPP access to a UE that may be operating in 5GMM-IDLE mode over 3GPP access and that may be operating in 5GMM-CONNECTED mode over non-3GPP access.

Notably, in the case that the UE is operating in 5GMM-IDLE mode over 3GPP access and operating in 5GMM-CONNECTED mode over non-3GPP access and downlink signaling or user data pending over 3GPP access is to be transferred, the AMF may trigger either the notification procedure or the paging procedure based on implementation choices/policies, e.g., according to the techniques disclosed herein.

Similarly, the techniques disclosed herein may allow a UE to determine which access to use to inform a PLMN of deregistration or for the network to inform the UE of deregistration. For example, a UE may initiate de-registration procedures in any of the following circumstances, among various possibilities: switch-off, airplane mode ON, 5G disabled for both accesses, UICC removal, UICC credential change, etc. These exemplary causes may require de-registration to occur for both 3GPP access as well as non-3GPP access. In other exemplary cases, e.g., cellular service turned off, turning off the Wi-Fi, turning off cellular carrier access over Wi-Fi, or due to channel conditions or load among various possibilities, a UE may deregister from a single access. In response to detecting a cause/trigger to deregister, with a single de-registration message a UE may deregister from both accesses. For this purpose, the 3GPP 24.501 specification provided an access type IE in a de-registration message. However, existing 3GPP specifications may not address the selection of the access type in which the device may send a "de-registration" message (Reference: 3GPP 24.501 section 5.5.2.2.1). Similarly, existing 3GPP specifications may not address the access type selection in which the NW may send a "de-registration" message (see section 5.5.2.3.1) in the event of NW-initiated deregistration. The network may also indicate via the access type whether the de-registration procedure is for 3GPP access, or for both 3GPP access and non-3GPP access when the UE is registered in the same PLMN for both accesses.

FIG. 7 illustrates exemplary techniques for selecting an access type. Aspects of the method of FIG. 7 may be implemented by a wireless device such as a network element or UE, or more generally in conjunction with any of the computer systems or devices shown in the Figures, among other devices, as desired. For example, a processor (or processors) of the UE (e.g., processor(s) 402, wireless communication circuitry 430, or a processor associated with wireless communication circuitry 430, among various possibilities) or network element (e.g., processor(s) 504 and/or 604, or a processor associated with radio 530, communication chain 532, or network port 470, among various possibilities) may cause the UE or network element (respectively) to perform some or all of the illustrated method elements. Note that while at least some elements of the method of FIG. 7 are described in a manner relating to the use of communication techniques and/or features associated with 3GPP specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A transmitting device (e.g., a UE, AMF, or other wireless device or network element) may determine (e.g., using a processor and/or other hardware) a type of message to be transmitted (710). The message may be a deregistration message or an indication of pending downlink signaling or downlink user data, among various possibilities. Note that the transmitting device may or may not actually perform the transmission or reception of any message. For example, if the transmitting device is a network element, the actual transmission may be performed by a base station or access point associated with the network (e.g., see 740, discussed below). Similarly, a transmitting device such as a smart watch or other accessory device may use a companion device, such as a smart phone, to transmit the message.

The transmitting device may determine and/or evaluate conditions (720) (e.g., using a processor and/or other hardware). The transmitting device may determine any combination of various types of conditions. Exemplary conditions are described below. The particular conditions to be evaluated may depend on the type of the first message. For example, one set of conditions may be evaluated for a first message type and a different (e.g., partly or entirely different) set of conditions may be evaluated for a second message type. Additional or different conditions may also be used, according to some embodiments.

The conditions may include connection status of a device (e.g., of the transmitting device or of a receiving device such as a UE or other device that may be the intended recipient of the message). For example, either the transmitting device or the receiving device may be a UE, and the conditions may include the connection status of the UE with respect to either or both of a 3GPP or non-3GPP access, among various possibilities. The transmitting device may determine whether the UE is connected (e.g., CM_CONNECTED) or idle (e.g., CM_IDLE) with respect to any or all accesses supported by the network. In other words, if the transmitting device is the UE, it may determine its own connection status with respect to the accesses; alternatively, if the transmitting device is not the UE, it may determine the connection status of the UE, e.g., based on information from the AMF or another network element. Further, other connection states may be considered. For example, the transmitting device may be in states such as disconnected, discontinuous reception (DRX), connected-mode DRX (C-DRX), active call, low power, C-MAS, roaming, etc. In some embodiments, a connected access (e.g., or an access in a C-DRX or similar state) may be preferably selected instead of an idle access.

The conditions may include information about the services for which data or signaling may be exchanged between the transmitting device and the receiving device, e.g., or between either device and one or more network elements. The service type may be associated with certain preferences or policies for transmitting protocol data units (PDUs) over one access as opposed to another. For example, the transmitting device may determine whether a service type (e.g., in combination with any applicable network policy) allows or permits (or encourages, discourages, incentivizes, etc.) data or signaling (e.g., PDUs for those purposes) to be exchanged over 3GPP only, non-3GPP only, or either 3GPP or non-3GPP, and an access may be selected accordingly. Further, the service type may indicate the extent to which the service can tolerate delays. For example, some services may be considered (e.g., according to network policy and/or user preferences) delay tolerant (e.g., email, SMS), while other services may not be delay tolerant (e.g., real-time voice). In some embodiments, a delay tolerant service may lead to selection of a non-3GPP access. The service type may be determined in any of various ways, e.g., by or based on an application executing on the transmitting or receiving device, based on quality of service (QoS) class indicator (QCI), based on characteristics of the traffic (e.g., packet size, length, duration, frequency/period, interval, regularity, or variation, etc.), among various possibilities. For example, a network operator may consider or weight a non-3GPP access as "less expensive" (or otherwise preferable) compared to a 3GPP access, and may implement a local network policy (e.g., a paging policy) to prioritize use of the non-3GPP access, e.g., for NAS notifications and/or other signaling associated with services that are delay tolerant.

The conditions may include information about past communications. For example, the conditions may include a number of attempts that a message transmission has previously been attempted (e.g., tried). Such a number may be compared to a threshold, e.g., a retry limit. In some embodiments, if such a retry limit threshold has been reached, a different access may be selected for further communication attempts or no further attempts may be made.

The conditions may include timing information, e.g., conditions may be determined based on one or more timers. For example, a timer may be started when a first message is transmitted or received, and the value of the timer (e.g., remaining time or whether the timer is expired) may be determined. In some embodiments, additional messages may be sent on the same or a different access if no response is received prior to expiration of a timer.

The conditions may include any of various metrics of channel conditions associated with either or both accesses. For example, metrics of channel quality, signal strength, interference, error rate, throughput, coding rate, transmission power, rank, or bandwidth may be used. Further, the metrics may include load/congestion of the network, one or more network elements, or of the accesses. In some embodiments, an access may be selected based on having better channel conditions relative to another access. For example, an access with higher signal strength and/or lower congestion may be selected. The transmitting device may perform one or more measurements to determine channel conditions, or may receive measurement values reported from another device(s). The measurements/values may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), block error rate (BLER), bit error rate (BER), channel impulse response (CIR), channel error response (CER), etc. The device may retain a history of measurement values. The device may compare the measurement values, or metrics calculated based on the measured values, to one or more thresholds. The device may use various parameters, e.g., for hysteresis, in such comparisons.

The conditions may include any attributes of the UE. For example, the conditions may include whether or not the device is link budget limited, e.g., whether the device is "power efficient" due to battery or other power constraints (e.g., hardware constraints). Further features of the device(s) may be considered, such as number of antennas. In some embodiments, a determination of a power efficient device may support a selection of a low power use access or communication approach. For example, a non-3GPP access may require less energy than a 3GPP access, and may be selected for/by a power efficient device such as a wearable/accessory device.

The conditions may include device mobility characteristics and mobility pattern history. For example, if the device is of a type that may be typically static in mobility (e.g., stationary or limited mobility) then the network and/or UE may prefer non-3GPP access over 3GPP access. In other words, a moving UE may be more likely to receive a message over 3GPP, and a 3GPP access may be selected on that basis. On the other hand, a stationary UE may not benefit from the features of 3GPP that offer advantages to moving devices, and therefore non-3GPP access may be selected for stationary UEs. Based on previous device mobility history, a network and/or UE may give a preference to one access over another access. For example, a UE in a location where the UE has historically moved rapidly may be better served by a 3GPP access.

The conditions may include policies or preferences of the network and/or UE. For example, a UE may have user settings or configurations that favor one access over another. Such settings or configurations may depend on various conditions such as message type, service type, location, etc. Similarly, network policies may indicate access selection, according to some embodiments. For example, a network policy may specify that a certain access is preferred or required, e.g., for messages of certain types and/or associated with certain service types. For example, a network may have a policy related to paging messages, NAS signaling, etc., and such a paging message policy may (or may not) be further defined for various service types, UE types, radio link conditions, etc.

Based at least in part on the determined message (e.g., message type) and the determined/evaluated conditions, the transmitting device may select an access (730). The transmitting device may (e.g., using a processor and/or other hardware) consider any or all of the conditions described above, among various possibilities. The access may be selected (e.g., according to network policy) with various goals including security, low power usage, likelihood that the message may be received successfully/quickly, etc. In some embodiments, the transmitting device may select multiple accesses. The conditions discussed above may be considered alone or in any of various combinations. For example, transmission of a notification message on non-3GPP access may not result in transmission of a GUTI in un-encrypted or un-secured manner, e.g., may not expose the GUTI on live air. In contrast, a 3GPP page may include transmission of the plain (e.g., un-encrypted) GUTI. In some embodiments, a non-3GPP access may be preferred in order to avoid the security risks associated with GUTI transmission. Similarly, a low-power access may be preferred, e.g., particularly for link-budget limited devices. Still further, based on a service type that indicates that the message must be received quickly, an access that is likely to result in a successful transmission promptly may be selected. In some embodiments, a connected access may be selected on such a basis. In some embodiments, if either or both access are connected or neither access is connected, a 3GPP access may be selected on such a basis (e.g., a service type associated with prompt reception). Alternatively, an access may be selected based on channel conditions, e.g., if both accesses are connected, but one access has better channel quality metrics (e.g., stronger signal strength, e.g., by at least a threshold difference), that access may be selected.

The transmitting device (e.g., or another device operating in association with the transmitting device) may transmit the message on the selected access to the receiving device (740). For example, a processor of the device may cause one or more antennas to transmit the message. The receiving device may receive and decode the message. Additional messages may be exchanged on either or both accesses.

Figure 8:
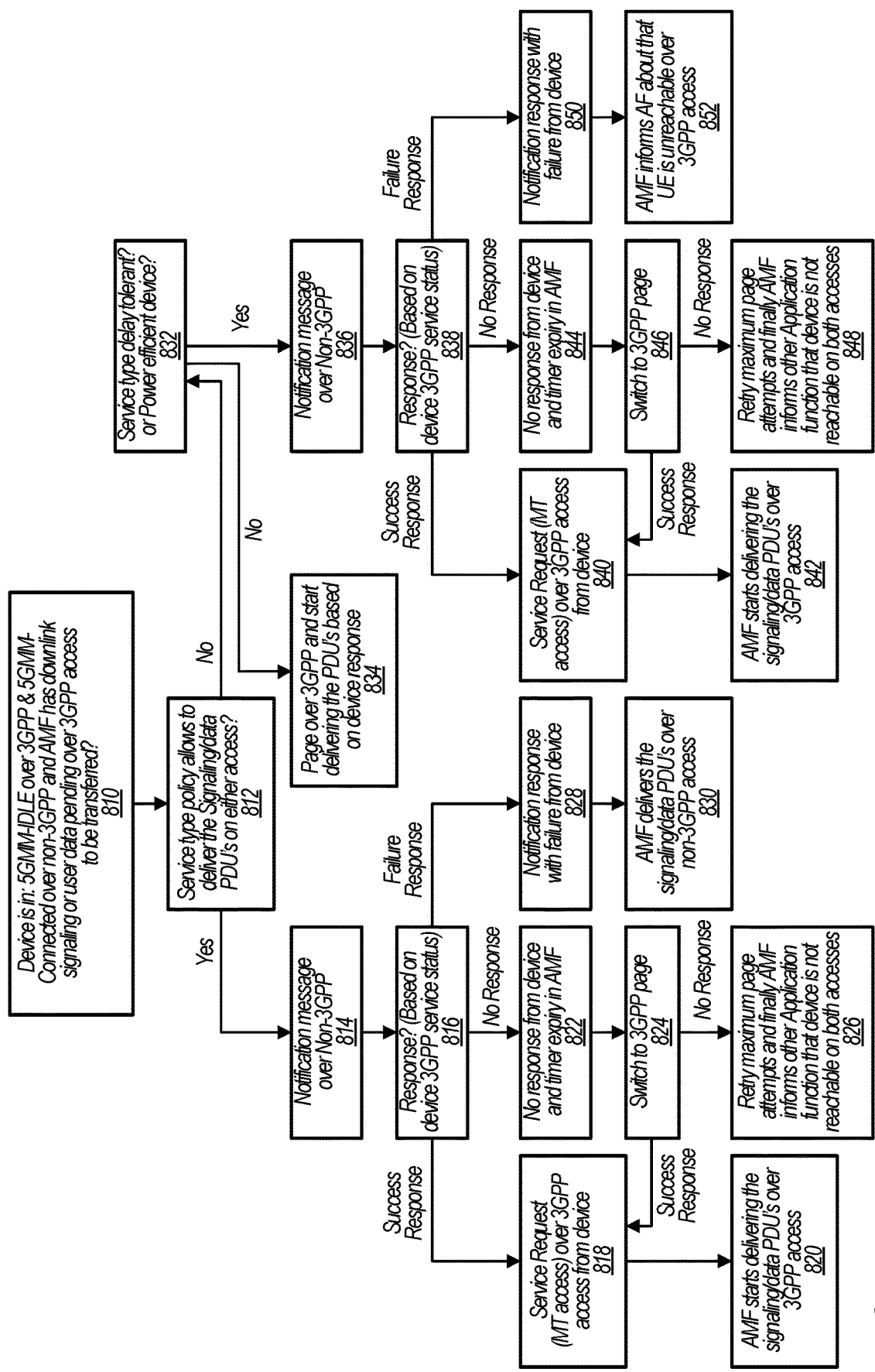
FIG. 8 illustrates an exemplary process for selecting and using an access for downlink (DL) signaling or data, according to some embodiments.

FIG. 8—Selection of an Access—Example for Downlink Signaling or Downlink Data

FIG. 8 illustrates an example of the techniques of FIG. 7, e.g., in the case that the message is from the network to a UE to inform the UE of the availability of downlink (DL) signaling and/or user data. Aspects of the method of FIG. 8 may be implemented by a wireless device such as a network element, or more generally in conjunction with any of the computer systems or devices shown in the Figures, among other devices, as desired. Note that while at least some elements of the method of FIG. 8 are described in a manner relating to the use of communication techniques and/or features associated with 3GPP specification documents, such description is not intended to be limiting to the disclosure, and aspects of the method of FIG. 8 may be used in any suitable wireless communication system, as desired. In various embodiments, some of the elements of the methods shown may be performed concurrently, in a different order than shown, may be substituted for by other method elements, or may be omitted. Additional method elements may also be performed as desired. For example, a processor(s) (e.g., 504, 604, or a processor associated with radio 530, communication chain 532, or network port 670, among various possibilities) and/or other hardware of a network element and/or base station may cause a base station, access point, and/or network element to perform any combination of the illustrated method elements, possibly in combination with additional method elements. As shown, the method may operate as follows.

In some embodiments, the method of FIG. 8 may be implemented by a network element (e.g., network element 600) such as an AMF, among various possibilities. For purposes of explanation, the following description may generally refer to an AMF, however it should be noted that various devices may perform similar functions as described with respect to the method of FIG. 8. The AMF (or other network element) may determine that it has downlink signaling or user data pending (collectively, "data") for a UE, that the data should be transferred over a 3GPP access, and that the UE is connected on non-3GPP access and idle over 3GPP access (810). Thus, the AMF may need to select an access to alert the UE of the availability of the data. The AMF may determine whether network policy (e.g., for a service type associated with the data) allows the data to be transmitted over either access (812).

If the policy does allow for the data to be transmitted on either access, the AMF may send (e.g., may cause an access point or other device to transmit) a notification message over non-3GPP access (814). The AMF may detect whether a response is received and determine a response type (816). In response to a success response (e.g., a service request for MT access over 3GPP access from the UE) (818), the AMF may begin delivering the data over the 3GPP access (820). Based on not detecting a response (e.g., prior to expiration of a timer, e.g., that may have been started by the AMF at the time of sending the notification message, e.g., the duration of the timer may be determined based on a paging policy of the network) (822), the AMF may switch to a 3GPP access and send a page (824). If the page results in a success response, the AMF may proceed as described above (818, 820). If no response is received (e.g., after a maximum number of retry attempts, e.g., according to a network paging policy), the AMF may determine that the UE is not reachable on both accesses, and may inform other network functions of this determination (826) (e.g., according to a network paging policy). Based on receiving a notification response, e.g., via non-3GPP access, from the device indicating failure (828), the AMF may deliver the data over non-3GPP access (830).

If the policy allows the data to be transmitted on 3GPP access only, the AMF may determine whether the service type is delay tolerant or if the device is power efficient (e.g., a link budget limited device) (832). These conditions may be evaluated according to network policy, e.g., a paging policy, which may, as discussed above, delineate delay tolerant vs. non-delay tolerant service types and/or power efficient vs. non-power efficient devices. If neither condition is true, the device may send (e.g., cause a base station to send) a page (or possibly multiple pages, e.g., according to network/paging policy) over 3GPP, and if the page is acknowledged successfully, may deliver the data over 3GPP (834). If either the service type is delay tolerant, the device is power efficient, or both (e.g., according to network policy), the AMF may send a notification message over non-3GPP (836). The AMF may determine whether a response is received, and the type of any response (838). If a success response is received (e.g., a service request over 3GPP) (840), the AMF may deliver data over 3GPP (842). If no response is received (e.g., prior to expiration of a timer associated with the notification, e.g., according to network policy) (844), the AMF may initiate a 3GPP page (846). In response to a successful page (840), the AMF may proceed with data transmission (842). If no response is received after the maximum number of retry attempts (e.g., according to network policy), the AMF may determine that the UE is not reachable and inform other network functions (848). If a failure response is received, e.g., over non-3GPP, to the notification message (850), the AMF may inform other network functions (e.g., the AF, e.g., a network function which that requested the AMF to deliver the data to the UE) that the UE is unreachable over 3GPP (852). In some embodiments, the AF (e.g., or AMF or other network function) may further determine (e.g., to make an exception to the policy) that the data should be delivered over non-3GPP access, and the AMF may proceed with such delivery in response to the determination.

Figure 9:
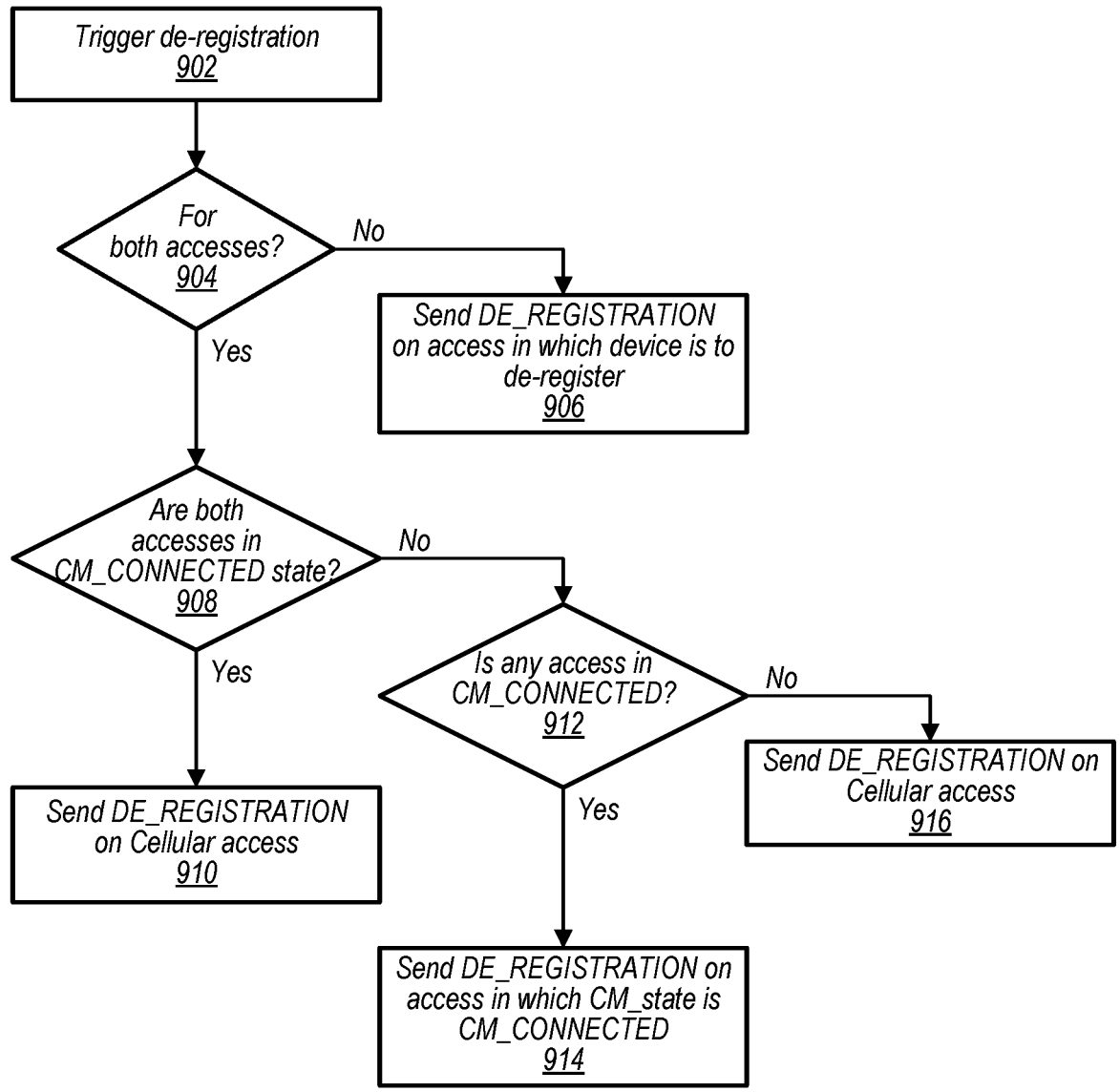
FIG. 9 illustrates an exemplary process for selecting and using an access for deregistration, according to some embodiments.

FIG. 9—Selection of an Access—Example for Deregistration

FIG. 9 illustrates an example of the techniques of FIG. 7, e.g., in the case that the message is a deregistration message. Such a message may be sent from the UE to the network or from the network to the UE, among various possibilities. Aspects of the method of FIG. 9 may be implemented by a wireless device such as a network element or a UE, or more generally in conjunction with any of the computer systems or devices shown in the Figures, among other devices, as desired. Note that while at least some elements of the method of FIG. 9 are described in a manner relating to the use of communication techniques and/or features associated with 3GPP specification documents, such description is not intended to be limiting to the disclosure, and aspects of the method of FIG. 9 may be used in any suitable wireless communication system, as desired. In various embodiments, some of the elements of the methods shown may be performed concurrently, in a different order than shown, may be substituted for by other method elements, or may be omitted. Additional method elements may also be performed as desired. For example, a processor(s) (e.g., 402, 504, 604, or a processor associated with wireless communication circuitry 430, radio 530, communication chain 532, or network port 670, among various possibilities) and/or other hardware of a UE, network element, and/or base station may cause a UE, base station, access point, and/or network element to perform any combination of the illustrated method elements, possibly in combination with additional method elements. As shown, the method may operate as follows.

A device (e.g., a UE or a network element), may determine to trigger deregistration of the UE from a network (902). The device may determine whether the deregistration is for one or both accesses (e.g., a 3GPP access and/or a non-3GPP access) (904). If the deregistration is for a single access, the device may send a deregistration on the access for which the deregistration is to be performed (906). If the deregistration is for both accesses, the device may further determine whether both accesses are in a connected state (908). If so, the device may send the deregistration message on a 3GPP access (e.g., cellular) (910). If both accesses are not connected, the device may further determine whether any access is connected (912). If one access is connected, the device may send the deregistration message on the connected access (914). If neither access is connected, the device may send the deregistration on the 3GPP access (916).

FIGS. 10-21—Additional Information

The following figures provide additional information and illustration of the techniques of FIG. 7. These examples are not intended to be limiting to the scope of the disclosure as a whole.

FIGS. 10-15—Downlink Paging

Figure 10:
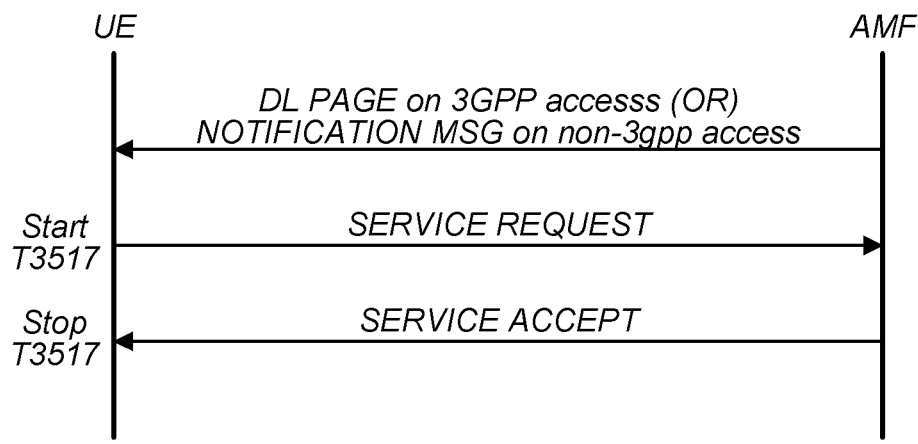
FIGS. 10-15 illustrate exemplary techniques for downlink paging, according to some embodiments.

FIG. 10 is a communication flow diagram, illustrating a series of messages between a UE and an AMF. As shown, the AMF may send (e.g., or cause a base station, access point, or similar device to send) a message to the UE. The message may inform the UE of pending DL signaling or user data destined for the UE. In some embodiments, the network may intend to transmit the pending data over a 3GPP access, e.g., following a service request and service acceptance process. The message may be a DL page on 3GPP access or may be a notification message on non-3GPP access, among various possibilities. In response to the message, the UE may respond with a service request (e.g., starting a timer, e.g., T3517, the duration of which may be set according to a network policy). In some embodiments, the service request may specify a reason for the service request. For example, the service request may specify reason MT (mobile terminated services), e.g., indicating that it requests service (e.g., a resource allocation) to download the signaling and/or data that is pending, e.g., as indicated by the message. The AMF may respond with a service accept message (e.g., thus causing the UE to end the timer, T3517). In some embodiments, the service request and service accept messages may be transmitted over the 3GPP access, e.g., whether the first message was a DL page on 3GPP or a notification message on non-3GPP.

Figure 11:
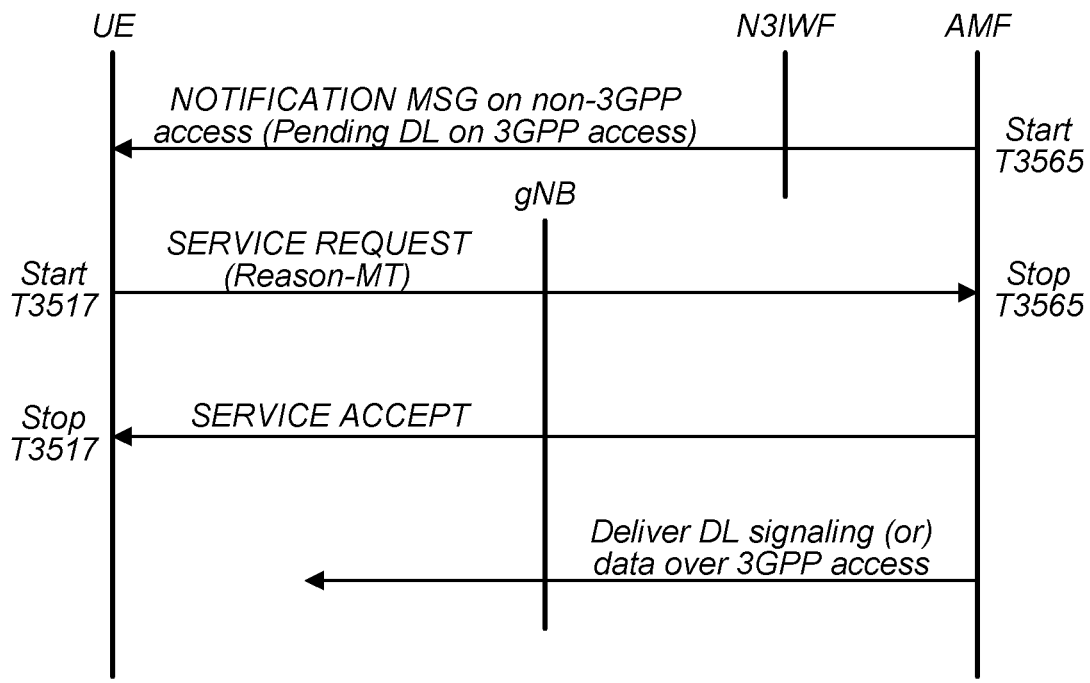

FIG. 11 is a communication flow diagram, illustrating a series of messages between a UE, an AMF, a base station (e.g., gNB), and a N3IWF. The UE may be in 5GMM-IDLE mode over 3GPP access and in 5GMM-CONNECTED mode over non-3GPP access. As shown, the AMF may send (e.g., or cause the N3IWF in coordination with an access point, or similar device to send) a notification message to the UE on a non-3GPP access (e.g., and start a timer, e.g., T3565, e.g., with a duration based on network policy). The message may inform the UE of pending DL signaling or user data destined for the UE. In some embodiments, the network may intend to transmit the pending data over a 3GPP access, e.g., following a service request and service acceptance process. In response to the message, the UE may respond with a service request transmitted to the gNB which may relay the request on to the AMF (e.g., starting T3517). The AMF may stop its timer (e.g., T3565) and respond with a service accept message via the gNB (e.g., ending T3517). The AMF, via the gNB, may provide the DL signaling or data to the UE over the 3GPP access. The illustrated case may be an example of a successful service request procedure.

Figure 12:
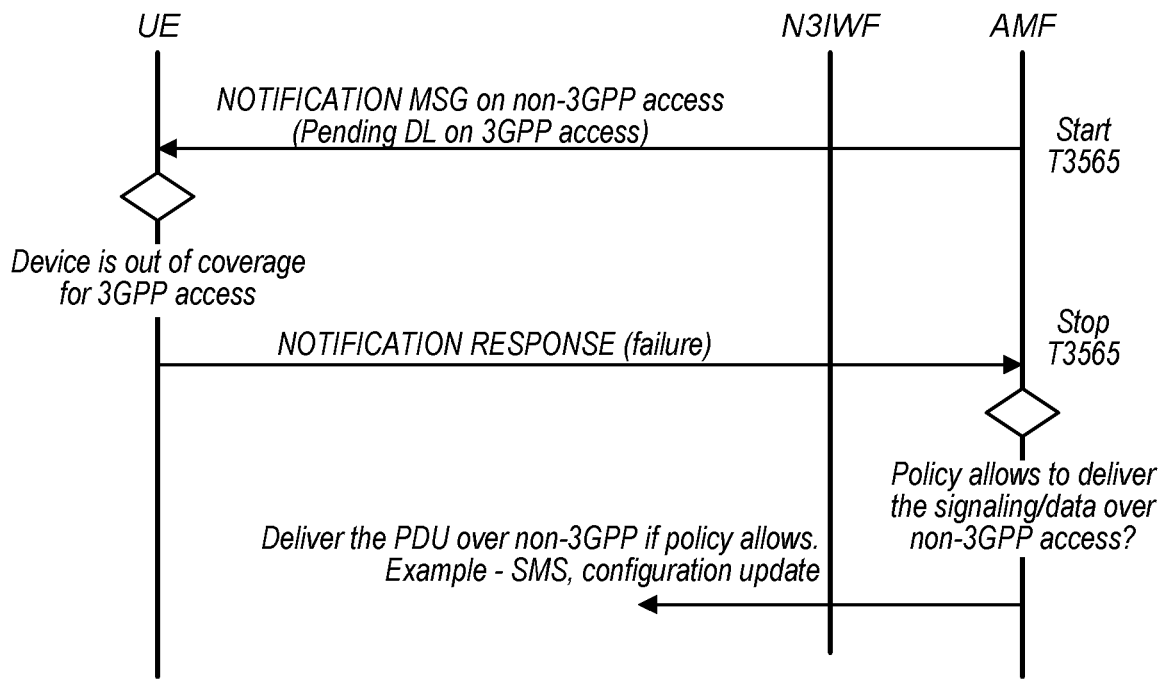

FIG. 12 is a communication flow diagram, illustrating a series of messages between a UE, an N3IWF and an AMF. The UE may be in 5GMM-IDLE mode over 3GPP access and in 5GMM-CONNECTED mode over non-3GPP access. As shown, the AMF may send (e.g., or cause the N3IWF, in coordination with a base station, access point, or similar device to send) a notification message to the UE over a non-3GPP access (e.g., and may start a timer, e.g., T3565). The message may inform the UE of pending DL signaling or user data destined for the UE. In some embodiments, the network may intend to transmit the pending data over a 3GPP access, e.g., following a service request and service acceptance process. In the illustrated example, the UE may be out of coverage or otherwise not reachable for the 3GPP access. In response to the message, the UE may respond with a notification response indicating a failure (e.g., causing the AMF to stop its timer, e.g., T3565). In other words, the UE may inform the AMF that it is unreachable over the 3GPP access. The AMF may determine whether network policy (e.g., given a service type of the data and/or other conditions) permits delivering the DL signaling and/or data over non-3GPP access. For example, SMS messages and/or configuration updates may transmitted over non-3GPP access, according to some embodiments. Note that the AMF may consider additional or different factors/conditions, e.g., instead of or in addition to network policy, according to some embodiments. Based on the network policy, the AMF may cause the N3IWF to deliver the DL data and/or signaling over the non-3GPP access.

Figure 13:
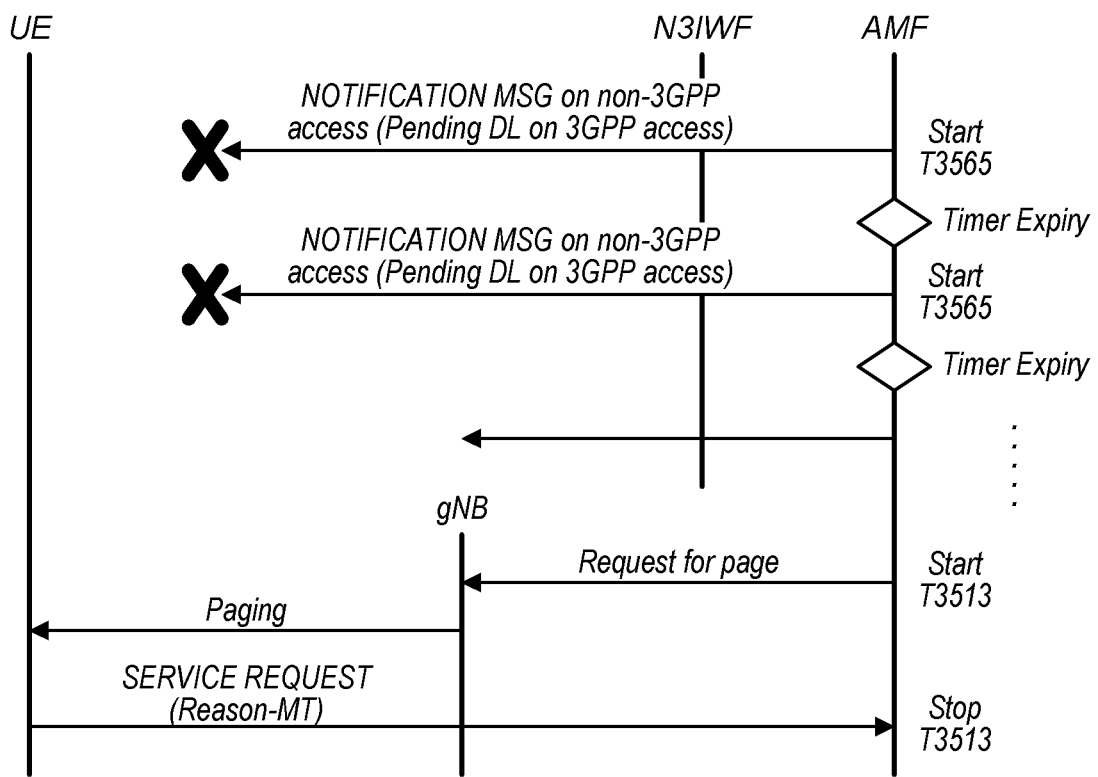

FIG. 13 is a communication flow diagram, illustrating a series of messages between a UE, an N3IWF, a gNB and an AMF. The UE may be in 5GMM-IDLE mode over 3GPP access and in 5GMM-CONNECTED mode over non-3GPP access. As shown, the AMF may send (e.g., or cause the N3IWF, in coordination with a base station, access point, or similar device to send) a notification message to the UE over a non-3GPP access. The AMF may start an associated timer (e.g., T3565) when the notification message is transmitted. The message may fail, e.g., because the UE may be out of service or not reachable on the non-3GPP access. Following expiration of the timer (e.g., T3565), the AMF may retry the notification message. The AMF may make a series of attempts to transmit the notification message (e.g., separated in time according to the timer) until a threshold (e.g., maximum allowed, e.g., according to network policy) number of retry attempts is reached. The threshold number of attempts may be configured as desired, according to some embodiments. Further, the threshold number of attempts may vary with other conditions (e.g., congestion on the network, history or motion of the UE, etc.). After the threshold is reached, the AMF may request that the gNB send a page over 3GPP access to the UE and may start an associated timer (e.g., T3513). The gNB may send the page. The UE may respond with a service request, e.g., over 3GPP access (e.g., and the AMF may stop T3513).

Figure 14:
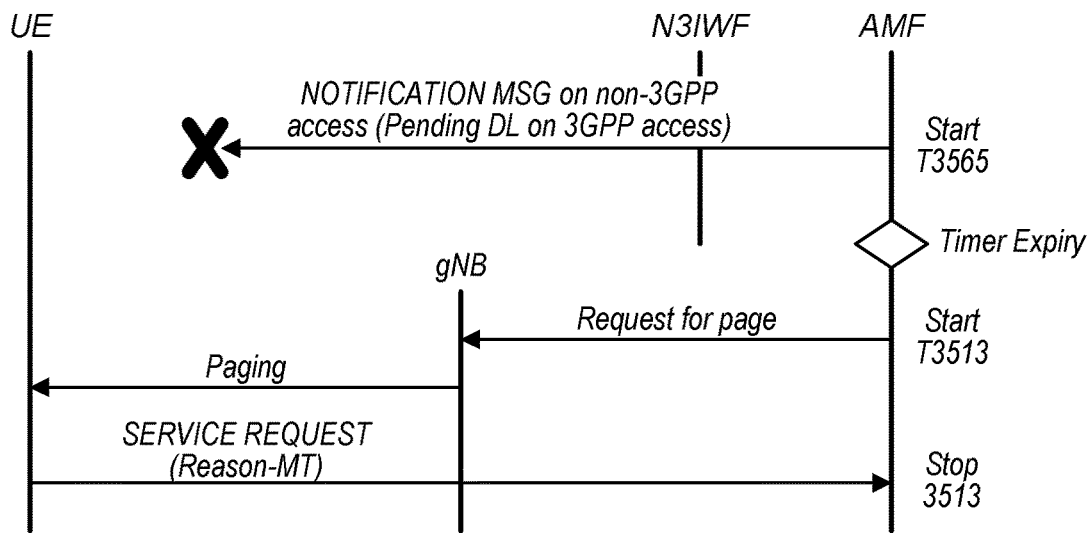

FIG. 14 is a communication flow diagram, illustrating a series of messages between a UE, an N3IWF, a gNB and an AMF. The UE may be in 5GMM-IDLE mode over 3GPP access and in 5GMM-CONNECTED mode over non-3GPP access. As shown, the AMF may send (e.g., or cause the N3IWF, in coordination with a base station, access point, or similar device to send) a notification message to the UE over a non-3GPP access. The AMF may start an associated timer (e.g., T3565) when the notification message is transmitted. The message (e.g., or the service request in response to the message) may fail, e.g., because the UE may be out of service or not reachable on the non-3GPP access or due to interference with the service request. Following expiration of the timer (e.g., T3565), the AMF may not retry the notification message, e.g., according to network policy. Instead, the AMF may request that the gNB send a page over 3GPP access to the UE and may start an associated timer (e.g., T3513). The gNB may send the page. The UE may respond with a service request (e.g., and the AMF may stop T3513). In the case that the UE received the notification message (e.g., over non-3GPP), but no service request was received by the AMF prior to expiration of T3565, the UE may already be in a CM-CONNECTED or SERVICE_REQUEST INITIATED state over 3GPP. The UE may ignore the duplication of the received message. For example, despite receiving the message twice (e.g., over each access), the UE may recognize that the message is the same.

Figure 15:
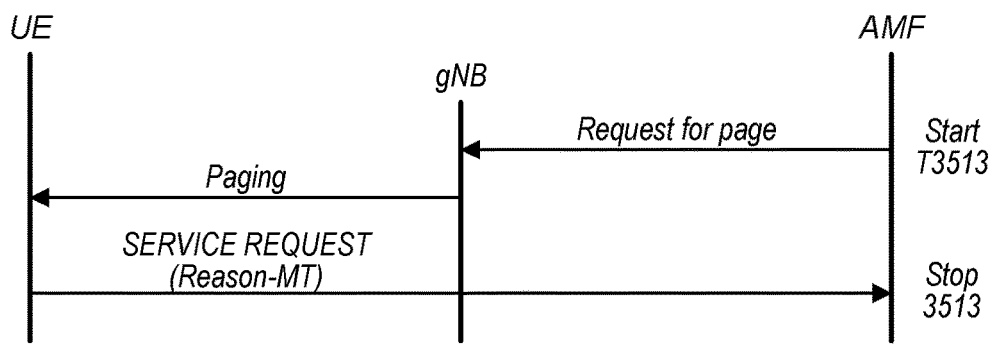

FIG. 15 is a communication flow diagram, illustrating a series of messages between a UE, a gNB and an AMF. The UE may be in 5GMM-IDLE mode over 3GPP access and in 5GMM-CONNECTED mode over non-3GPP access. As shown, the AMF may send (e.g., or cause the gNB to send) a page to the UE over a 3GPP access. The AMF may start an associated timer (e.g., T3513) when the request for page is transmitted. The UE may respond with a service request, e.g., over 3GPP access (e.g., and the AMF may stop T3513, e.g., in response to the service request).

Figure 16:
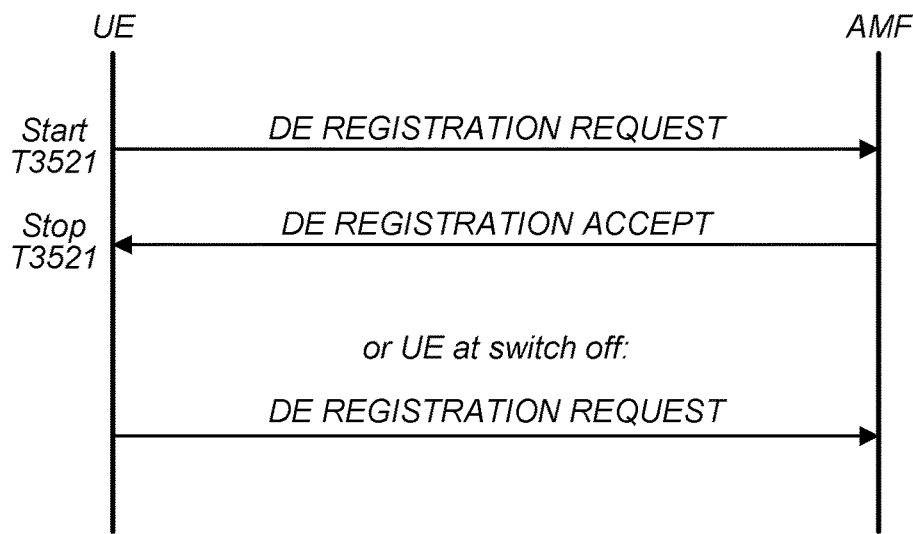
FIG. 16 illustrates exemplary techniques for deregistration, according to some embodiments.

FIGS. 16—Deregistration

FIG. 16 is a communication flow diagram, illustrating a series of messages between a UE and an AMF relating to UE-initiated deregistration procedures. As shown, the UE may send a deregistration request message to the AMF, e.g., over a 3GPP access and/or non-3GPP access. The UE may start a timer (e.g., T3521). The AMF may respond with a deregistration accept, and the UE may stop the timer. In the case that the deregistration is due to switching off the UE, the UE may start a 5 second (or other duration, as desired) timer locally to accommodate sufficient time to transmit the message and the AMF may not reply with a deregistration accept message. The AMF and the UE may each complete other procedures as necessary to perform the deregistration.

FIGS. 17-21—Network and Device Architecture

Figure 17:
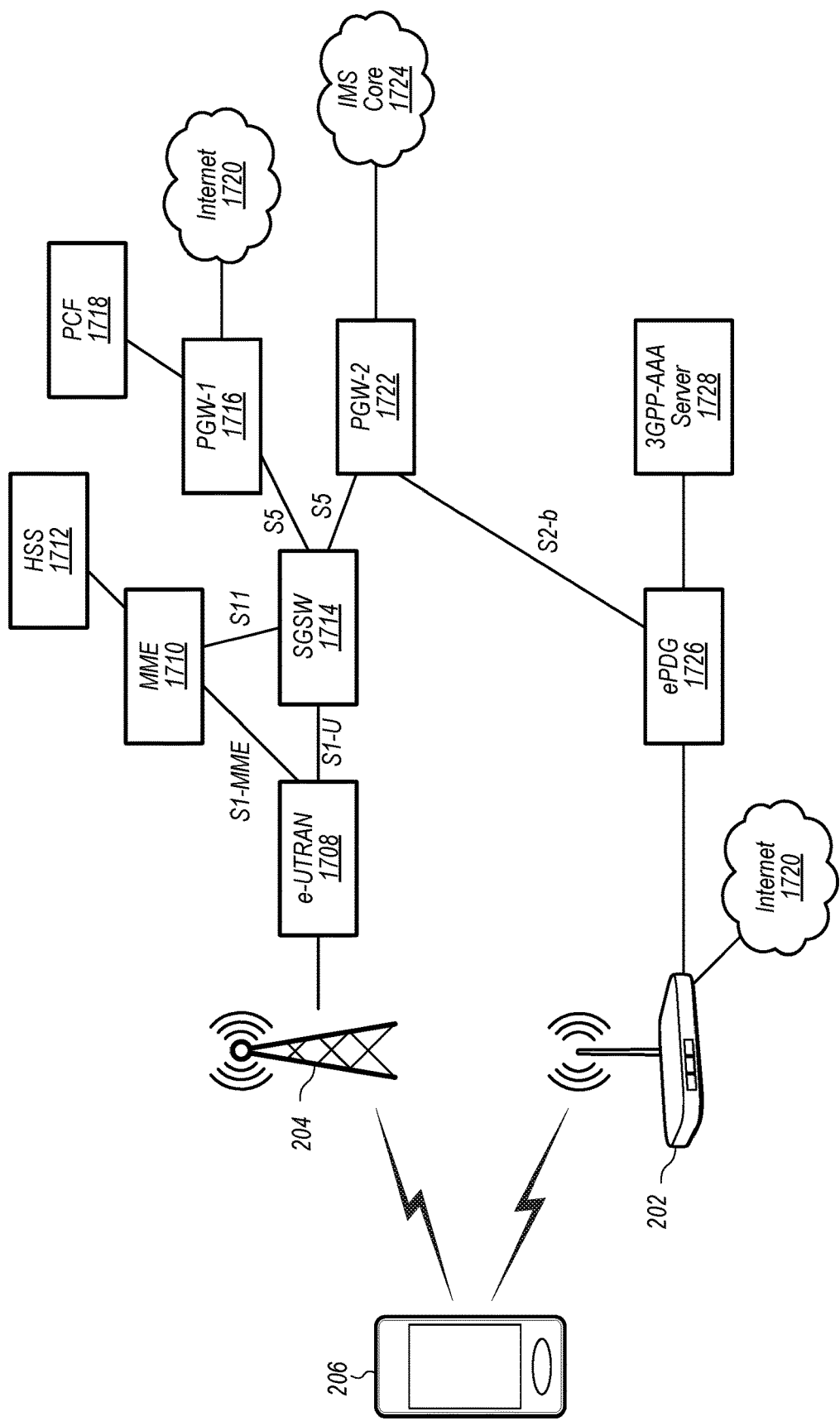
FIGS. 17-21 illustrate exemplary aspects of network and device architecture, according to some embodiments.

FIG. 17 is a block diagram illustrating LTE network (e.g., PLMN) architecture including non-3GPP access, according to some embodiments. The architecture shown is exemplary only, and other architectures may be configured as desired. As shown, a UE (e.g., UE 206) may have accesses through a 3GPP/cellular RAN (e.g., a 3GPP access) and a non-3GPP access point (e.g., AP 202) (e.g., a non-3GPP access). The 3GPP RAN access may include a base station (e.g., eNB 204). The RAN may in turn connect to an e-UTRAN (Evolved Universal Mobile Telecommunications System (UMTS) Terrestrial Radio Access Network 1708) which may include other network functions, which may in combination provide the UE a connection to the internet and IMS core of the network. Similarly, the non-3GPP access point may connect to the internet and the IMS core of the network (as well as other network functions) via an evolved packet data gateway (ePDG). Thus, the network may be able to provide services of the network functions through either access. As illustrated, the network functions may include: MME, SGSW, HSS, PGW, PCF, and 3GPP AAA server. These functions may be provided by various devices and connected via various interfaces. Signaling may flow between the MME, SGSW, PGW1, PGW2, and ePDG. Data may flow between the internet, SGSW, PGW1, PGW2, and ePDG.

Figure 18:
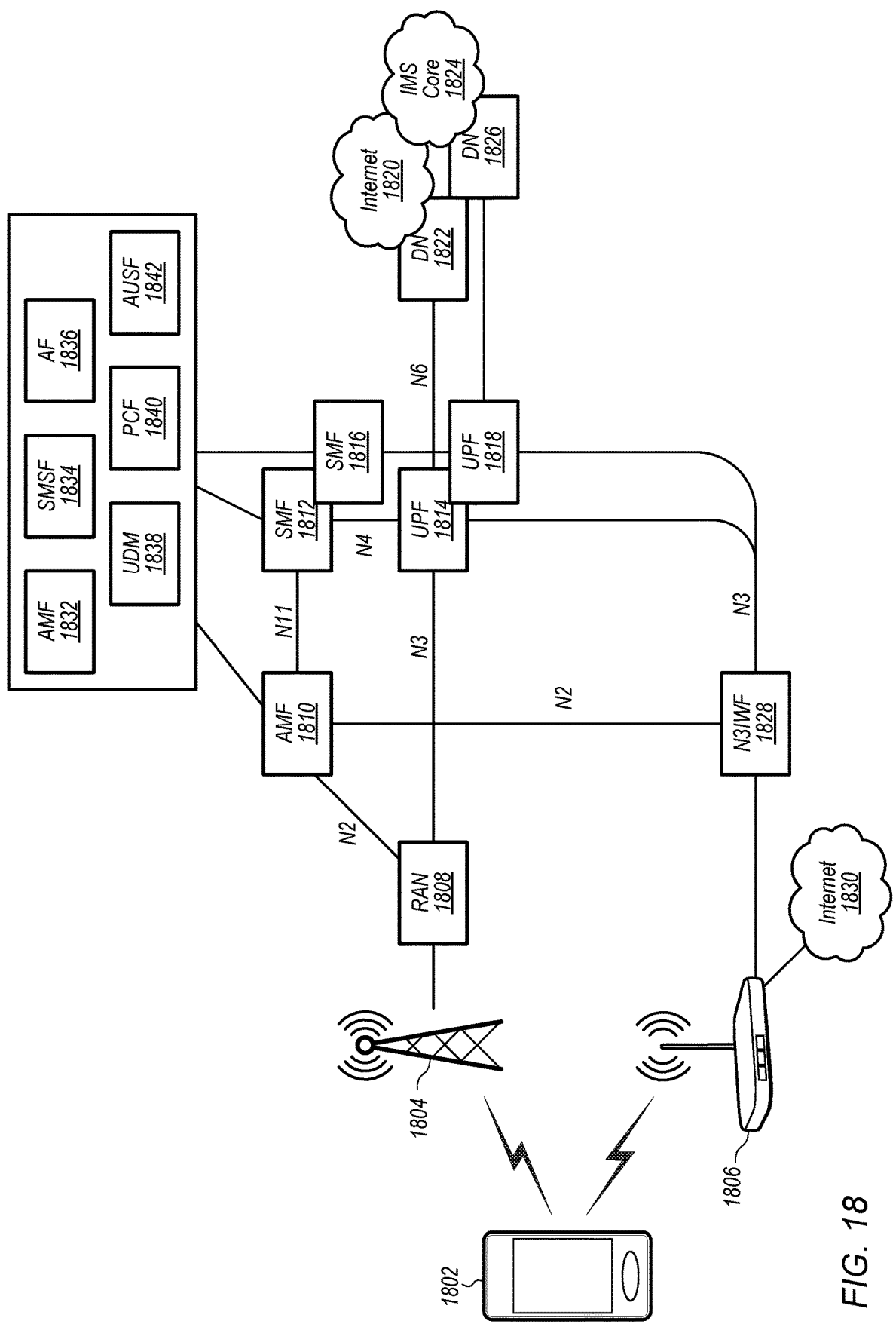

FIG. 18 is a block diagram illustrating 5G network (e.g., PLMN) architecture including non-3GPP access, according to some embodiments. The architecture shown is exemplary only, and other architectures may be configured as desired. As shown, a UE 206 may have accesses through a 3GPP/cellular RAN and a non-3GPP access point. The 3GPP RAN access may include a base station (e.g., gNB 204). The RAN may in turn connect to an AMF and other network functions, which may in combination provide the UE a connection to the internet and IMS core of the network. Similarly, the non-3GPP access point may connect to the internet and the IMS core of the network (as well as other network functions) via an N3IWF. Thus, the network may be able to provide services of the network functions through either access. As illustrated, the network functions may include: 5GMM, NSSF, SMSF, AF, UDM, PCF, AUSF, 5G-SM, SMF, and UPF. These functions may be provided by various devices and connected via various interfaces. Signaling may flow between the SMF, AMF, and N3IWF. Data may flow between the internet, UPF, and N3IWF.

Figure 19:
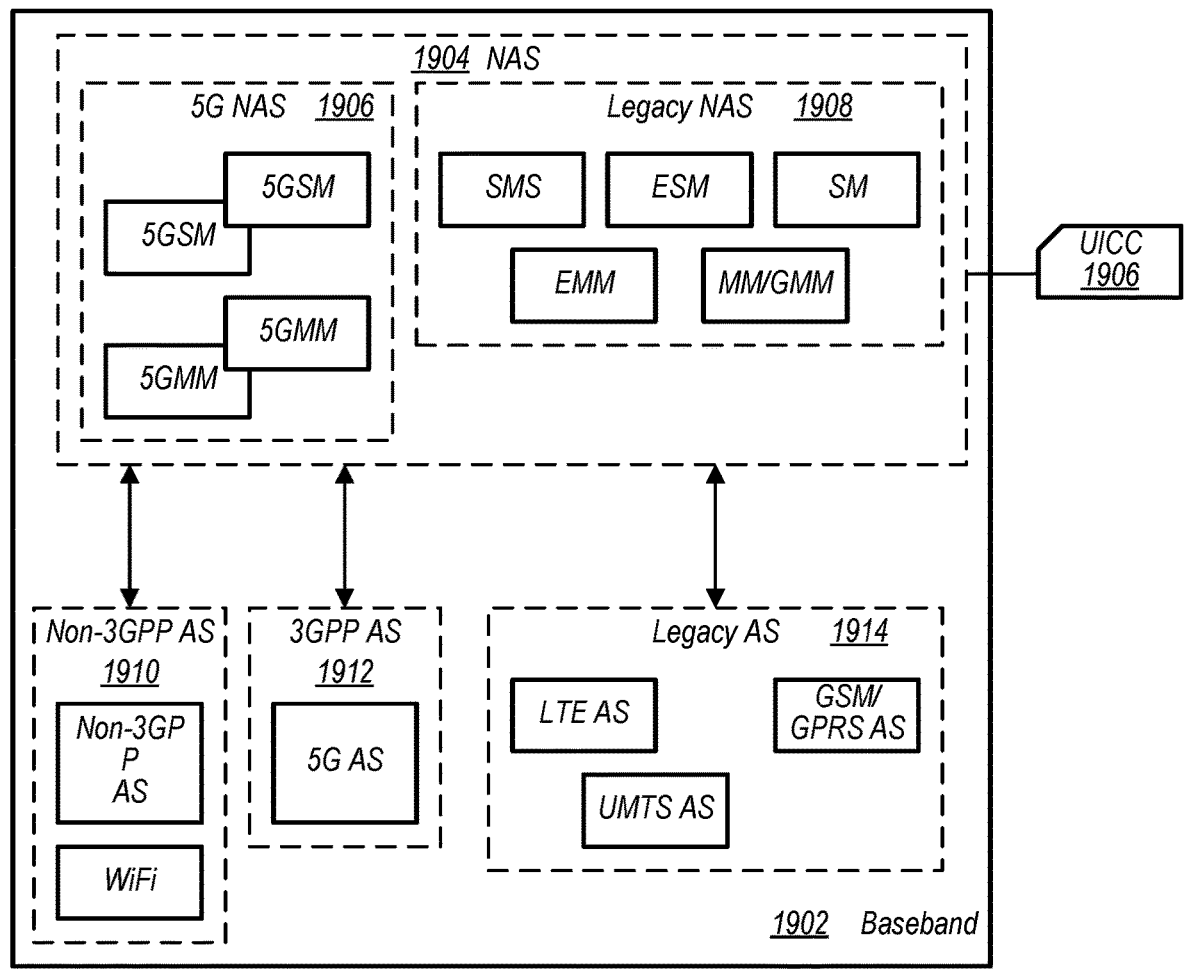

FIG. 19 is a block diagram illustrating 5G device architecture, according to some embodiments. The architecture shown may apply to UEs, network elements, or other devices implementing 5G. Other architectures are possible. As shown, the NAS 1904 may include a 5G portion 1906 (e.g., common to 3GPP and non-3GPP) and a legacy portion 1908. The legacy NAS 1908 may communicate with legacy access stratum (AS) 1914. The common 5G portion 1906 may include shared or duplicated functions (e.g., 5GSM and 5GMM) for 3GPP access (e.g., 3GPP AS 1912) and non-3GPP AS 1910. The 5GMM may maintain individual CM (Connection management) and RM (registration management) state machines. A UE device may be registered to a single PLMN (same 5G CN) using 5G cellular access as well as non-3GPP access. It may be possible for device to be in CONNECTED state in one access and IDLE in another access and vice versa. Common 5G-MM procedures (registration, de-registration, identification, authentication etc.) may be performed for both accesses. A device may have multiple active PDN's on both access. A device may typically be in an on (e.g., CM-CONNECTED) state over non-3GPP except on corner cases. A network (NW) may send Notification on one access about the other access. A NW may page UE on 3GPP access. Paging may not applicable to non-3GPP access, according to some embodiments. The AS functions (1910, 1912, and 1914) may communicate with baseband 1902.

Figure 20:
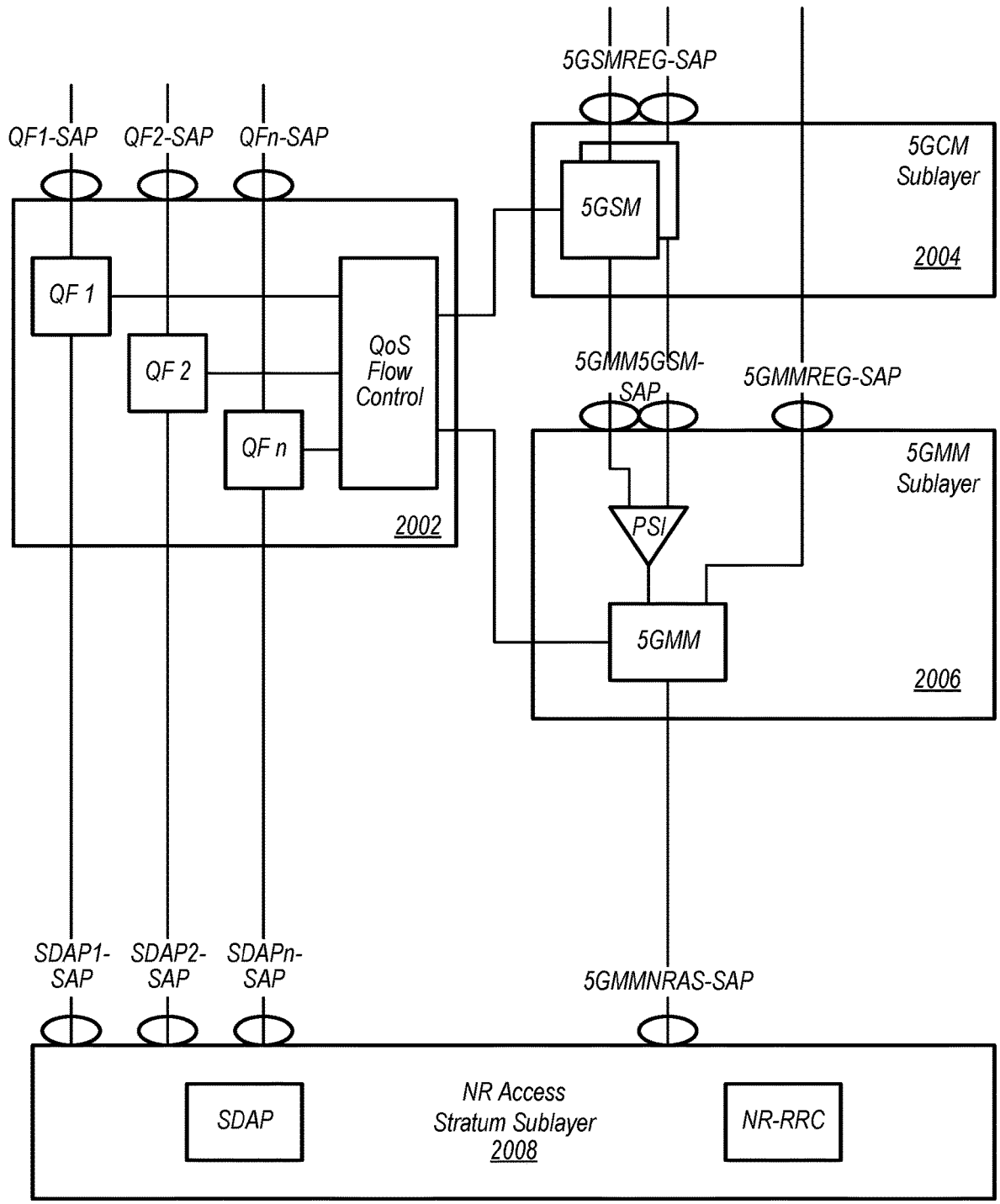
Figure 21:
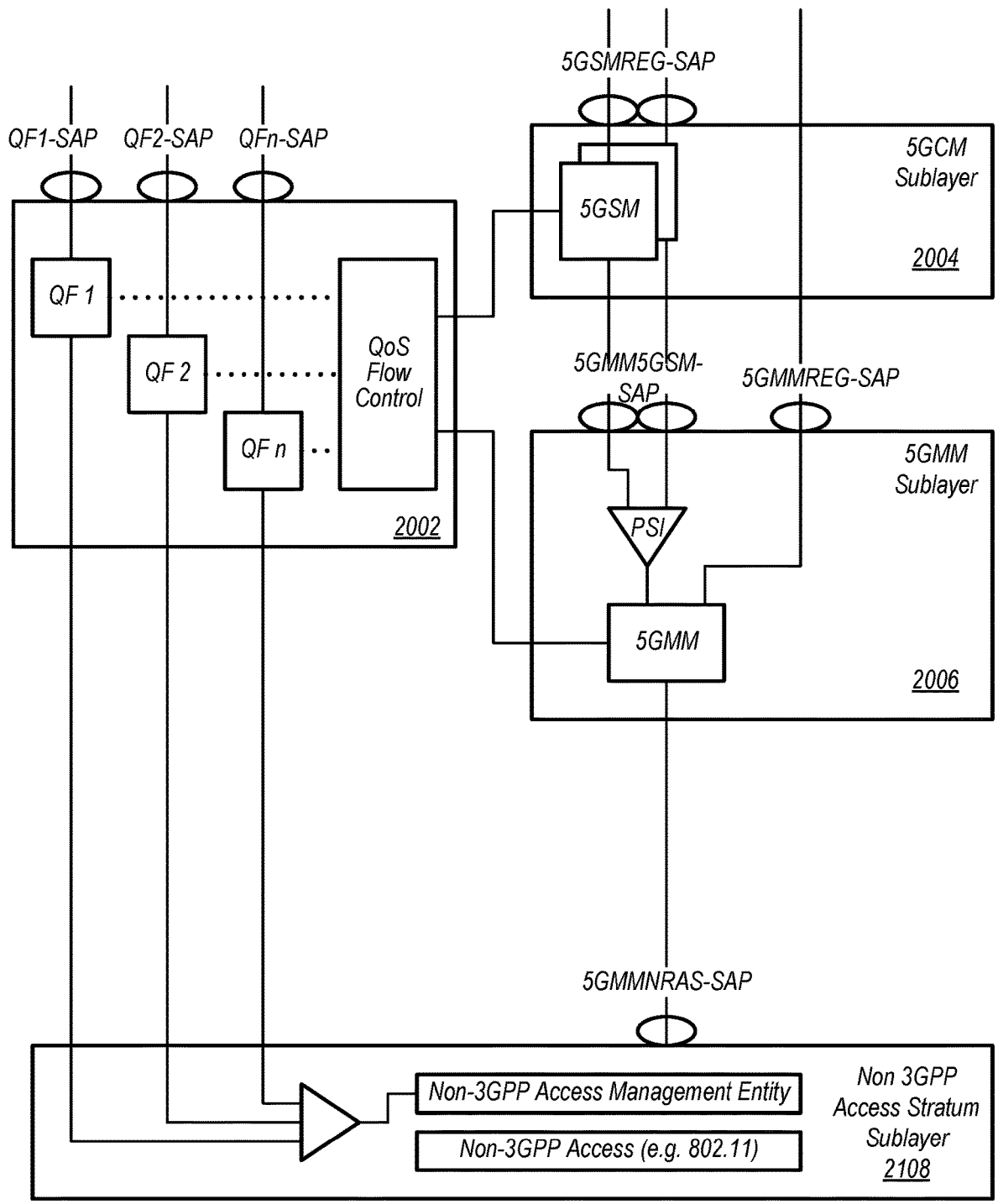

FIGS. 20-21 further illustrate 5G device architecture, according to some embodiments. FIGS. 20-21 provide a comparison of the 3GPP AS sublayer (FIG. 20) to the non-3GPP AS sublayer (FIG. 21). FIGS. 20 and 21 illustrate flow control (2002), 5G connection management (5GCM) sublayer (2004), and 5G mobility management (5GMM or 5G-MM) sublayer (2006). Flow control (2002) includes any number of service access points (SAP) connecting to other layers for various QoS flows (e.g., QFs 1-n). FIG. 20 further illustrates the NR (e.g., 3GPP) AS sublayer (2008). The NR AS sublayer (2008) further includes SDAP and RRC functions. FIG. 21 provides additional detail focusing on the non-3GPP AS sublayer (2108). The non-3GPP AS sublayer (2108) includes a non-3GPP access management entity for managing one or more non-3GPP accesses (e.g., 802.11 access). Note that the illustrated embodiments are exemplary only and that other architectures are possible.

Exemplary Embodiments

In the following further exemplary embodiments are provided.

One set of embodiments may include a method, comprising: by a first device:

registering a user equipment device (UE) with a public land mobile network (PLMN) using a 3GPP access; registering the UE with the PLMN using a non-3GPP access; detecting a cause to deregister the UE with the PLMN; determining one or more conditions; selecting, based at least in part on the one or more conditions, a selected access; and transmitting, on the selected access, a deregistration message.

According to some embodiments, the one or more conditions may comprise a connection state of at least a first access, wherein the first access is one of the 3GPP access or the non-3GPP access.

In some embodiments, the connection state of the first access may be connected, wherein the selected access is the first access.

In some embodiments, the one or more conditions may comprise a connection state of the 3GPP access and a connection state of the non-3GPP access.

In some embodiments, the connection state of the 3GPP access may be connected, the connection state of the non-3GPP access may be connected, and the selected access may be the 3GPP access.

In some embodiments, the connection state of the 3GPP access may be idle, the connection state of the non-3GPP access may be idle, and the selected access may be the 3GPP access.

In some embodiments, the one or more conditions may comprise that the deregistration is for a single access, and the selected access may be the single access.

In some embodiments, the first device may be the UE.

In some embodiments, the first device may be a network element of the PLMN.

A further set of embodiments may include a method comprising: by a network element of a 5G network: establishing a 3GPP access with a wireless device; establishing a non-3GPP access with the wireless device; determining a message for the wireless device; determining at least one condition; selecting, based on the at least one condition, a selected access, wherein the selected access is one of the 3GPP access and the non-3GPP access; and sending the message on the selected access.

In some embodiments, the at least one condition may comprise a connection status of at least one of the 3GPP access or non-3GPP access.

In some embodiments, the message may comprise an indication that downlink signaling or user data is pending for the wireless device, and the at least one condition may comprise a service type associated with the downlink signaling or user data.

In some embodiments, the at least one condition may comprise information about past communications.

In some embodiments, the at least one condition may comprise timing information.

In some embodiments, the at least one condition may comprise an attribute of the wireless device.

In some embodiments, the at least one condition may comprise a policy of the 5G network.

A further set of embodiments may include an apparatus comprising: a processing element, wherein the processing element may be configured to cause a network element of a 5G network to: establish at least two accesses with a wireless device; determine a first message for the wireless device; determine at least one condition; selecting, based on the at least one condition, a selected access, wherein the selected access is one of the at least two accesses; and send the first message on the selected access.

In some embodiments, the processing element may be further configured to cause the network element of the 5G network to: determine that a first response to the first message has been received; and determine a type of the first response.

In some embodiments, the type of the first response may be a failure response, wherein the processing element is further configured to cause the network element of the 5G network to: deliver, in response to the failure response, data to the UE on the selected access.

In some embodiments, the processing element may be further configured to cause the network element of the 5G network to: determine that no response to the first message has been received; and switch, based on determining that no response has been received, to a second access and transmit the message on the second access.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a network element or a UE, among various possibilities) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a network element of a 5G network:
establishing a 3GPP access with a wireless device;
establishing a non-3GPP access with the wireless device;
determining that there is pending downlink data for the wireless device;
in response to the determination that there is pending downlink data for the wireless device:
determining to send an alert to the wireless device of the pending downlink data for the wireless device, wherein sending the alert to the wireless device to the pending downlink data comprises sending at least one of a page on the 3GPP access or a notification message on the non-3GPP access; and
determining a service type associated with the pending downlink data;
selecting one of the 3GPP access or the non-3GPP access for sending the alert, wherein said selecting is based on the service type associated with the pending downlink data; and
sending the alert on the selected access.

2. The method of claim 1, wherein the method further comprises determining a connection status of at least one of the 3GPP access or non-3GPP access.

3. The method of claim 1, wherein the method further comprises determining information about past communications.

4. The method of claim 1, wherein the method further comprises determining timing information.

5. The method of claim 1, wherein the method further comprises determining an attribute of the wireless device.

6. The method of claim 1, wherein the method further comprises determining a policy of the 5G network.

7. The method of claim 1, the method further comprising determining whether the service type is delay tolerant.

8. An apparatus comprising:
a processor, wherein the processor is configured to cause a network element of a cellular network to:
register a wireless device using a 3GPP access and a non-3GPP access;
determine that the wireless device is in a connected mode over the non-3GPP access and idle over the 3GPP access;
determine that there are pending downlink protocol data units (PDUs) for the wireless device; and
in response to determining that the wireless device is in a connected mode over the non-3GPP access and idle over the 3GPP access and that there are pending downlink PDUs for the wireless device:
determine whether a service type of the pending downlink PDUs is associated with the 3GPP access; and
when the service type of the pending downlink PDUs is associated with the 3GPP access, send a page to the wireless device over the 3GPP access; or
otherwise, send a notification to the wireless device over the non-3GPP access.

9. The apparatus of claim 8, wherein sending the page to the wireless device over the 3GPP access is further based on local network policy.

10. The apparatus of claim 9, wherein the local network policy comprises a paging policy.

11. The apparatus of claim 9, wherein the local network policy comprises a policy of a 5G network.

12. The apparatus of claim 8, wherein sending the page to the wireless device over the 3GPP access is further based on a retry limit.

13. The apparatus of claim 8, wherein sending the page to the wireless device over the 3GPP access is further based on an attribute of the wireless device.

14. The apparatus of claim 8, wherein sending the page to the wireless device over the 3GPP access is further based on a timer.

15. The apparatus of claim 8, wherein the service type is associated with an application executing on the wireless device.

16. The apparatus of claim 8, wherein the service type is associated with traffic characteristics.

17. A non-transitory memory medium comprising program instructions configured to cause a network element of a cellular network to:
register a wireless device using a 3GPP access and a non-3GPP access;
determine that the wireless device is in a connected mode over the non-3GPP access and idle over the 3GPP access;
determine that there are pending downlink packets for the wireless device; and
in response to determining that the wireless device is in a connected mode over the non-3GPP access and idle over the 3GPP access and that there are pending downlink packets for the wireless device:
   determine whether a service type of the pending downlink packets is associated with the 3GPP access according to a local policy; and
      when the service type of the pending downlink packets is associated with the 3GPP access according to the local policy, send a page to the wireless device over the 3GPP access; or
   otherwise, send a notification to the wireless device over the non-3GPP access.

18. The non-transitory memory medium of claim 17, wherein the local policy comprises a paging policy.

19. The non-transitory memory medium of claim 17, wherein the local policy comprises a policy of a 5G network.

20. The non-transitory memory medium of claim 17, wherein sending the page to the wireless device over the 3GPP access is further based on information about past communications.

* * * * *